US011642710B2

(12) United States Patent
Nakajima

(10) Patent No.: US 11,642,710 B2
(45) Date of Patent: May 9, 2023

(54) ROLL PRESS MACHINE, CONTROLLING SYSTEM OF ROLL PRESS MACHINE, AND CONTROLLING METHOD OF ROLL PRESS MACHINE

(71) Applicant: SINTOKOGIO, LTD., Nagoya (JP)

(72) Inventor: Shogo Nakajima, Shinshiro (JP)

(73) Assignee: SINTOKOGIO, LTD., Aichi (JP)

( * ) Notice: Subject to any disclaimer, the term of this patent is extended or adjusted under 35 U.S.C. 154(b) by 137 days.

(21) Appl. No.: 17/041,651

(22) PCT Filed: Mar. 1, 2019

(86) PCT No.: PCT/JP2019/008218
§ 371 (c)(1),
(2) Date: Sep. 25, 2020

(87) PCT Pub. No.: WO2019/187994
PCT Pub. Date: Oct. 3, 2019

(65) Prior Publication Data
US 2021/0114071 A1 Apr. 22, 2021

(30) Foreign Application Priority Data
Mar. 28, 2018 (JP) .............................. JP2018-061399

(51) Int. Cl.
*B21B 37/58* (2006.01)
*B21C 51/00* (2006.01)

(52) U.S. Cl.
CPC .............. *B21B 37/58* (2013.01); *B21C 51/00* (2013.01)

(58) Field of Classification Search
CPC ....... B21B 37/58; B21B 37/16; B21B 37/165; B21B 37/60; B21B 37/72; B21B 38/04;
(Continued)

(56) References Cited

U.S. PATENT DOCUMENTS 3,712,095 A * 1/1973 Dowsing ................. B21B 37/22
72/12.5
2003/0164017 A1 9/2003 Thiele
2012/0082895 A1 4/2012 Kimura et al.

FOREIGN PATENT DOCUMENTS

JP          55120425 A  *  9/1980   ............. B21B 37/72
JP          55156616 A  *  12/1980
(Continued)

OTHER PUBLICATIONS

Machine translation of KR-20100078816-A (Year: 2010).*
(Continued)

*Primary Examiner* — Shelley M Self
*Assistant Examiner* — Teresa A Guthrie
(74) *Attorney, Agent, or Firm* — Crowell & Moring LLP

(57) ABSTRACT

A roll press machine that presses-forming of a work is disclosed in which a plurality of electrode layers having been baked on a metal foil. The material is supplied as a work W into a gap between a lower roll and an upper roll for consolidating. As the work travels through the gap, a controlling device is configured to maintain the gap larger than a consolidating gap until the front edge of the work passes through the gap by a first predetermined distance, then maintain the gap equal to the consolidation gap until the rear edge of the work arrives downstream of the gap by a second predetermined distance, and maintain the gap larger than the consolidation gap until the rea edge leaves the gap.

15 Claims, 15 Drawing Sheets

(58) Field of Classification Search
CPC ......... B21B 38/00; B21B 38/08; B21B 38/10;
B21B 38/105; B21B 2271/02; B21B
2273/12; B21B 2273/14; B21B 2273/16;
B21B 31/20; B21B 2271/025; B21C
51/00; B30B 3/00; B30B 3/04
USPC ...... 72/12.8, 15.4, 7.5, 8.8, 10.7, 11.1, 11.5,
72/12.5, 240, 248
See application file for complete search history.

(56) References Cited

FOREIGN PATENT DOCUMENTS

| JP | 61172603 A | * | 8/1986 | ............... B21B 1/06 |
| --- | --- | --- | --- | --- |
| JP | S61-209701 A | | 9/1986 | |
| JP | S61-249601 A | | 11/1986 | |
| JP | H05-169117 A | | 7/1993 | |
| JP | H07-265919 A | | 10/1995 | |
| JP | 2004-087264 A | | 3/2004 | |
| JP | 2004-509763 A | | 4/2004 | |
| JP | 2009-274109 A | | 11/2009 | |
| JP | 2011-042828 A | | 3/2011 | |
| JP | 2012-081507 A | | 4/2012 | |
| JP | 2012-094490 A | | 5/2012 | |
| JP | 2013-022615 A | | 2/2013 | |
| JP | 2015-223615 A | | 12/2015 | |
| KR | 10-2010-0078816 A | | 7/2010 | |
| KR | 20100078816 A | * | 7/2010 | |

OTHER PUBLICATIONS

Machine translation of JP-61172603-A (Year: 1986).*
Office Action in Japan Application No. 2020-510502, including English translation, date drafted Sep. 17, 2021, 12 pages.

* cited by examiner

ROLL PRESS MACHINE, CONTROLLING SYSTEM OF ROLL PRESS MACHINE, AND CONTROLLING METHOD OF ROLL PRESS MACHINE

CROSS-REFERENCE TO RELATED APPLICATIONS

This application is a 371 application of PCT/JP2019/008218 having an international filing date of Mar. 1, 2019, which claims priority to JP2018-061399 filed Mar. 28, 2018, the entire content of each of which is incorporated herein by reference.

TECHNICAL FIELD

The present invention pertains to a roll press machine, a controlling system of a roll press machine, and a controlling method of a roll press machine.

BACKGROUND ART

A roll press machine including a pair of lifting apparatuses has been conventionally known. For example, a forming-roll gap adjusting mechanism including a pair of lifting apparatuses has been disclosed in Patent Document 1. In addition, a pass line adjusting equipment including a pair of lifting apparatuses has been disclosed in Patent Document 2.

FIG. 18 corresponds to FIG. 1 of Patent Document 1. In the forming-roll gap adjusting mechanism shown in FIG. 18, each lifting apparatus uses an adjustment piece 312 having a wedged surface 313 to cause a bearing housing 306 having a tapered surface 311 to move up and down. A feed screw mechanism 315 is provided as a mechanism to cause the wedged surface 313 of the adjustment piece 312 to slidably move relative to the tapered surface 311 of the bearing housing 306.

FIG. 19 corresponds to FIG. 3 of Patent Document 2. A wedge member 402 having a sloped surface 407a is used to move up and down with respect to a housing 408 having a sloped surface 408a. A hydraulic cylinder 404 is provided as a mechanism to cause the sloped surface 407a of the wedge member 402 to slidably move relative to the sloped surface 408a of the housing 408.

Herein, as a work of a roll press machine, the present inventors have particularly studied a metal foil after an electrode material has been applied thereon, which is usable for a rechargeable battery.

In detail, a paste electrode material is applied and baked on a metal foil capable of functioning as a current collector. Then, one electrode layer is formed. By repeating this process, a plurality of electrode layers are formed sequentially. For example, a copper foil intended to function as a cathode is used as a base material, and a cathode layer, a solid electrolyte layer and an anode layer are formed thereon in this order.

In general, the metal foil is continuously fed out from a rolled state. On the other hand, in general, the electrode layers are intermittently applied on the metal foil at even intervals (with gaps).

In a material in which a plurality of electrode layers having been baked on a metal foil as described above, there are spaces between the applied and baked electrode layers as well as there are spaces inside the respective electrode layers. That is to say, adhesiveness between particles (elements) of the raw material is low. This means that migration pathway is narrow for ions serving as a charge carrier. Thus, conductivity is low, which means that performance as a battery is not sufficient.

To the contrary, it is conceivable that, if it is possible to remove or reduce the spaces between the electrode layers as well as the spaces in the respective electrode layers, it is possible to enhance the adhesiveness between the particles (elements) of the raw material and thus it is possible to enhance the performance as a battery. Taking this into consideration, it has been studied to carry out a press-forming to a material in which a plurality of electrode layers having been baked on a metal foil.

PRIOR ART DOCUMENT

Patent Document List

Patent Document 1 is JP-A-H05-169117.
Patent Document 2 is JP-A-H07-265919.

SUMMARY OF INVENTION

Technical Problem

The present inventors have found that, by maintaining uniform thickness precision of a press-formed work with high precision, it is possible to effectively remove or reduce the spaces between the electrode layers as well as the spaces in the respective electrode layers.

If the thickness precision of a press-formed work is higher, the problem that thickness variation may cause an undesired gap at a subsequent assembling step to deteriorate the performance as a battery is inhibited.

Under the circumstances, the present inventors have studied and studied to develop a roll press machine capable of maintaining uniform thickness precision of a press-formed work with high precision.

Then, the present inventors have found that it is possible to control an operation of a roll press machine with high precision by adopting a moving apparatus which uses a rotational force of an electric motor.

Furthermore, the present inventors have found that, at a press-forming for a material in which a plurality of electrode layers having been baked on a metal foil, when the material is supplied as a work W into a gap between a lower roll and an upper roll for consolidating, a concentrated load may be generated at a front edge of the work, and also when the material is moved out of the gap, a concentrated load may be generated at a rear edge of the work. In those cases, chipping or crackling may be caused at the material (at the front and/or rear edges of the material). Then, the present inventors have found that, by finely controlling a moving apparatus using an electric motor, it is possible to prevent generation of such a concentrated load.

The present invention has been made based on the above findings. The object of the present invention is to provide a roll press machine capable of preventing generation of a concentrated load at a work by finely controlling a gap between a lower roll and an upper roll for consolidating with high precision.

Alternatively, the object of the present invention is to provide a controlling system of a roll press machine, the controlling system being capable of preventing generation of a concentrated load at a work by finely controlling a gap between a lower roll and an upper roll for consolidating with high precision.

Alternatively, the object of the present invention is to provide a controlling method of a roll press machine, the controlling method being capable of preventing generation of a concentrated load at a work by finely controlling a gap between a lower roll and an upper roll for consolidating with high precision.

Solution to Problem

The present invention is a roll press machine comprising: a one side roll and another side roll arranged opposite to each other for consolidating a work; a one side roll supporting part configured to support the one side roll in such a manner that the one side roll is rotatable; another side roll supporting part configured to support the other side roll in such a manner that the other side roll is rotatable; a moving apparatus using an electric motor and configured to move the one side roll supporting part and/or the other side roll supporting part relative to each other to control a gap between the one side roll and the other side roll; a work supplying device configured to supply the work through the gap; a position sensor configured to detect a position of a front edge of the work supplied into the gap by the work supplying device; and a controlling device configured to control the moving apparatus based on detection results by the positon sensor; wherein the controlling device is configured to control the moving apparatus in such a manner that the gap is coincided with a consolidating gap at a timing when the front edge of the work has passed through a narrowest position of the gap by a first predetermined distance and that the gap is maintained larger than the consolidation gap until the front edge of the work has passed through the narrowest position of the gap by the first predetermined distance.

According to the present invention, since the moving apparatus using the electric motor is adopted, the gap between the one side roll and the other side roll can be finely controlled with high precision. In addition, by carrying out the control wherein the gap is set to the consolidating gap at a timing when the front edge of the work has passed through the narrowest position of the gap by the first predetermined distance, it is possible to effectively prevent generation of a concentrated load when the work is supplied into the gap.

According to the results of the experiments carried out by the present inventors, when a material consisting of a plurality of electrode layers having been baked on a metal foil is used as a work, it is effective that the first predetermined distance is within a range of 0.001 mm to 3.000 mm, preferably within a range of 1 mm to 3 mm.

In addition, it is preferable that the position sensor is also configured to detect a position of a rear edge of the work supplied into the gap by the work supplying device, and that the controlling device is configured to control the moving apparatus in such a manner that the gap is maintained to the consolidation gap until the rear edge of the work has arrived at a position of a second predetermined distance toward the narrowest position of the gap and that the gap is set larger than the consolidation gap at a timing when the rear edge of the work has arrived at the position of the second predetermined distance toward the narrowest position of the gap.

In this case, by carrying out the control wherein the gap is set larger than the consolidation gap at a timing when the rear edge of the work has arrived at the position of the second predetermined distance toward the narrowest position of the gap, it is possible to effectively prevent generation of a concentrated load when the work is moved out of the gap.

According to the results of the experiments carried out by the present inventors, when a material consisting of a plurality of electrode layers having been baked on a metal foil is used as a work, it is effective that the second predetermined distance is within a range of 0.001 mm to 3.000 mm, preferably within a range of 1 mm to 3 mm.

In addition, the present invention is a roll press machine comprising: a one side roll and another side roll arranged opposite to each other for consolidating a work; a one side roll supporting part configured to support the one side roll in such a manner that the one side roll is rotatable; another side roll supporting part configured to support the other side roll in such a manner that the other side roll is rotatable; a moving apparatus using an electric motor and configured to move the one side roll supporting part and/or the other side roll supporting part relative to each other to control a gap between the one side roll and the other side roll; a work supplying device configured to supply the work through the gap; a load sensor configured to detect a load of the one side roll and/or the other side roll; and a controlling device configured to control the moving apparatus based on detection results by the load sensor; wherein the controlling device is configured to control the moving apparatus, while the work supplying device is operated, in such a manner that the gap is maintained larger than a consolidation gap until the load sensor has detected a predetermined load increase per unit time and that the gap starts being reduced to the consolidation gap at a timing when the load sensor has detected the predetermined load increase per unit time.

According to the present invention as well, since the moving apparatus using the electric motor is adopted, the gap between the one side roll and the other side roll can be finely controlled with high precision. In addition, by carrying out the control wherein the gap starts being reduced to the consolidation gap at a timing when (only after) the load sensor has detected the predetermined load increase per unit time when the work is supplied into the gap, it is possible to cause a so-called biting of the work W to precede the control. Thereby, it is possible to effectively prevent generation of a conventional concentrated load when the work W is supplied into the gap.

According to the results of the experiments carried out by the present inventors, when a material consisting of a plurality of electrode layers having been baked on a metal foil is used as a work, it is effective to set the predetermined load increase per unit time to a value within a range of 100 N/msec to 1000 N/msec, preferably within a range of 100 N/msec to 200 N/msec.

In addition, it is preferable that the controlling device is configured to control the moving apparatus, while the work supplying device is operated after the gap has finished being reduced to the consolidation gap, in such a manner that the gap is maintained to the consolidation gap until the load sensor has detected a predetermined load decrease per unit time and that the gap starts being returned to an original state thereof larger than the consolidation gap at a timing when the load sensor has detected the predetermined load decrease per unit time.

In this case, by carrying out the control wherein the gap starts being returned to the original state larger than the consolidation gap at a timing when the load sensor has detected the predetermined load decrease per unit time when the rear edge of the work approaches the narrowest position of the gap (but has not still passed through the narrowest position), it is possible to cause the control to precede a so-called moving-out of the work W. Thereby, it is possible to effectively prevent generation of a conventional concentrated load when the work W is moved out of the gap.

According to the results of the experiments carried out by the present inventors, when a material consisting of a plurality of electrode layers having been baked on a metal foil is used as a work, it is effective to set the predetermined load decrease per unit time to a value within a range of 100 N/msec to 1000 N/msec, preferably within a range of 100 N/msec to 200 N/msec.

In the above respective inventions, it is preferable that the consolidation gap is a constant value within a range of 70% to 90% of a thickness of the work before consolidation.

According to the results of the experiments carried out by the present inventors, when a material consisting of a plurality of electrode layers having been baked on a metal foil is used as a work, if the above conditions are adopted, it is possible to effectively remove or reduce spaces between the electrode layers as well as spaces in the respective electrode layers, which can enhance performance as a battery.

Alternatively, it is preferable that the consolidation gap is a value fluctuated with a frequency of 1 Hz to 10 Hz within a range of 70% to 110% of a thickness of the work before consolidation.

According to the results of the experiments carried out by the present inventors, when a material consisting of a plurality of electrode layers having been baked on a metal foil is used as a work, if the above conditions are adopted as well, it is possible to effectively remove or reduce spaces between the electrode layers as well as spaces in the respective electrode layers, which can enhance performance as a battery.

Furthermore, in this case, compared with a case wherein the consolidation gap is a constant value, the load of the work is reduced, i.e., the loads of various elements for consolidating the work (the one side roll, the other side roll, the one side roll supporting part, the other side roll supporting part) are reduced. Thus, deflection of the various elements is also reduced, so that the roll press machine can be operated much more stably.

In addition, the present invention is a controlling system for controlling a roll press machine, the roll press machine including: a one side roll and another side roll arranged opposite to each other for consolidating a work; a one side roll supporting part configured to support the one side roll in such a manner that the one side roll is rotatable; another side roll supporting part configured to support the other side roll in such a manner that the other side roll is rotatable; a moving apparatus using an electric motor and configured to move the one side roll supporting part and/or the other side roll supporting part relative to each other to control a gap between the one side roll and the other side roll; and a work supplying device configured to supply the work through the gap; the controlling system comprising: a position sensor configured to detect a position of a front edge of the work supplied into the gap by the work supplying device; and a controlling device configured to control the moving apparatus based on detection results by the positon sensor; wherein the controlling device is configured to control the moving apparatus in such a manner that the gap is coincided with a consolidating gap at a timing when the front edge of the work has passed through a narrowest position of the gap by a first predetermined distance and that the gap is maintained larger than the consolidation gap until the front edge of the work has passed through the narrowest position of the gap by the first predetermined distance.

According to the controlling system of the present invention, by controlling the moving apparatus using the electric motor, the gap between the one side roll and the other side roll can be finely controlled with high precision. In addition, by carrying out the control wherein the gap is set to the consolidating gap at a timing when the front edge of the work has passed through the narrowest position of the gap by the first predetermined distance, it is possible to effectively prevent generation of a concentrated load when the work is supplied into the gap.

In addition, the present invention is a controlling system for controlling a roll press machine, the roll press machine including: a one side roll and another side roll arranged opposite to each other for consolidating a work; a one side roll supporting part configured to support the one side roll in such a manner that the one side roll is rotatable; another side roll supporting part configured to support the other side roll in such a manner that the other side roll is rotatable; a moving apparatus using an electric motor and configured to move the one side roll supporting part and/or the other side roll supporting part relative to each other to control a gap between the one side roll and the other side roll; and a work supplying device configured to supply the work through the gap; the controlling system comprising: a load sensor configured to detect a load of the one side roll and/or the other side roll; and a controlling device configured to control the moving apparatus based on detection results by the load sensor; wherein the controlling device is configured to control the moving apparatus, while the work supplying device is operated, in such a manner that the gap is maintained larger than a consolidation gap until the load sensor has detected a predetermined load increase per unit time and that the gap starts being reduced to the consolidation gap at a timing when the load sensor has detected the predetermined load increase per unit time.

According to the controlling system of the present invention, by controlling the moving apparatus using the electric motor, the gap between the one side roll and the other side roll can be finely controlled with high precision. In addition, by carrying out the control wherein the gap starts being reduced to the consolidation gap at a timing when (only after) the load sensor has detected the predetermined load increase per unit time when the work is supplied into the gap, it is possible to cause a so-called biting of the work W to precede the control. Thereby, it is possible to effectively prevent generation of a conventional concentrated load when the work W is supplied into the gap.

In addition, the present invention is a controlling method of controlling a roll press machine, the roll press machine including: a one side roll and another side roll arranged opposite to each other for consolidating a work; a one side roll supporting part configured to support the one side roll in such a manner that the one side roll is rotatable; another side roll supporting part configured to support the other side roll in such a manner that the other side roll is rotatable; a moving apparatus using an electric motor and configured to move the one side roll supporting part and/or the other side roll supporting part relative to each other to control a gap between the one side roll and the other side roll; and a work supplying device configured to supply the work through the gap; the controlling method comprising the steps of: detecting a position of a front edge of the work supplied into the gap by the work supplying device; and controlling the moving apparatus based on detection results by the detecting step; wherein in the controlling step, the gap is set to a consolidating gap at a timing when the front edge of the work has passed through a narrowest position of the gap by a first predetermined distance and that the gap is maintained larger than the consolidation gap until the front edge of the work has passed through the narrowest position of the gap by the first predetermined distance.

According to the controlling method of the present invention, by controlling the moving apparatus using the electric motor, the gap between the one side roll and the other side roll can be finely controlled with high precision. In addition, since the gap is set to the consolidating gap at a timing when the front edge of the work has passed through the narrowest position of the gap by the first predetermined distance, it is possible to effectively prevent generation of a concentrated load when the work is supplied into the gap.

In addition, the present invention is a controlling method of controlling a roll press machine, the roll press machine including: a one side roll and another side roll arranged opposite to each other for consolidating a work; a one side roll supporting part configured to support the one side roll in such a manner that the one side roll is rotatable; another side roll supporting part configured to support the other side roll in such a manner that the other side roll is rotatable; a moving apparatus using an electric motor and configured to move the one side roll supporting part and/or the other side roll supporting part relative to each other to control a gap between the one side roll and the other side roll; and a work supplying device configured to supply the work through the gap; the controlling method comprising the steps of: detecting a load of the one side roll and/or the other side roll while the work supplying device is operated; and controlling the moving apparatus based on detection results by the detecting step; wherein, in the controlling step, while the work supplying device is operated, the gap is maintained larger than a consolidation gap until a predetermined load increase per unit time has been detected and that the gap starts being reduced to the consolidation gap at a timing when the predetermined load increase per unit time has been detected.

According to the controlling method of the present invention, by controlling the moving apparatus using the electric motor, the gap between the one side roll and the other side roll can be finely controlled with high precision. In addition, by carrying out the control wherein the gap starts being reduced to the consolidation gap at a timing when (only after) the predetermined load increase per unit time has been detected when the work is supplied into the gap, it is possible to cause a so-called biting of the work W to precede the control. Thereby, it is possible to effectively prevent generation of a conventional concentrated load when the work W is supplied into the gap.

Advantageous Effects of Invention

According to a roll press machine in accordance with one aspect of the present invention, since the moving apparatus using the electric motor is adopted, the gap between the one side roll and the other side roll can be finely controlled with high precision. In addition, by carrying out the control wherein the gap is set to the consolidating gap at a timing when the front edge of the work has passed through the narrowest position of the gap by the first predetermined distance, it is possible to effectively prevent generation of a concentrated load when the work is supplied into the gap.

Alternatively, according to a roll press machine in accordance with another aspect of the present invention, since the moving apparatus using the electric motor is adopted, the gap between the one side roll and the other side roll can be finely controlled with high precision. In addition, by carrying out the control wherein the gap starts being reduced to the consolidation gap at a timing when (only after) the load sensor has detected the predetermined load increase per unit time when the work is supplied into the gap, it is possible to cause a so-called biting of the work W to precede the control. Thereby, it is possible to effectively prevent generation of a conventional concentrated load when the work W is supplied into the gap.

In addition, according to a controlling system in accordance with one aspect of the present invention, by controlling the moving apparatus using the electric motor, the gap between the one side roll and the other side roll can be finely controlled with high precision. In addition, by carrying out the control wherein the gap is set to the consolidating gap at a timing when the front edge of the work has passed through the narrowest position of the gap by the first predetermined distance, it is possible to effectively prevent generation of a concentrated load when the work is supplied into the gap.

Alternatively, according to a controlling system in accordance with another aspect of the present invention, by controlling the moving apparatus using the electric motor, the gap between the one side roll and the other side roll can be finely controlled with high precision. In addition, by carrying out the control wherein the gap starts being reduced to the consolidation gap at a timing when (only after) the load sensor has detected the predetermined load increase per unit time when the work is supplied into the gap, it is possible to cause a so-called biting of the work W to precede the control. Thereby, it is possible to effectively prevent generation of a conventional concentrated load when the work W is supplied into the gap.

In addition, according to a controlling method in accordance with one aspect of the present invention, by controlling the moving apparatus using the electric motor, the gap between the one side roll and the other side roll can be finely controlled with high precision. In addition, since the gap is set to the consolidating gap at a timing when the front edge of the work has passed through the narrowest position of the gap by the first predetermined distance, it is possible to effectively prevent generation of a concentrated load when the work is supplied into the gap.

Alternatively, according to a controlling method in accordance with another aspect of the present invention, by controlling the moving apparatus using the electric motor, the gap between the one side roll and the other side roll can be finely controlled with high precision. In addition, by carrying out the control wherein the gap starts being reduced to the consolidation gap at a timing when (only after) the predetermined load increase per unit time has been detected when the work is supplied into the gap, it is possible to cause a so-called biting of the work W to precede the control. Thereby, it is possible to effectively prevent generation of a conventional concentrated load when the work W is supplied into the gap.

DESCRIPTION OF EMBODIMENTS

With reference to the attached drawings, embodiments of the present invention are explained below.

Figure 1:
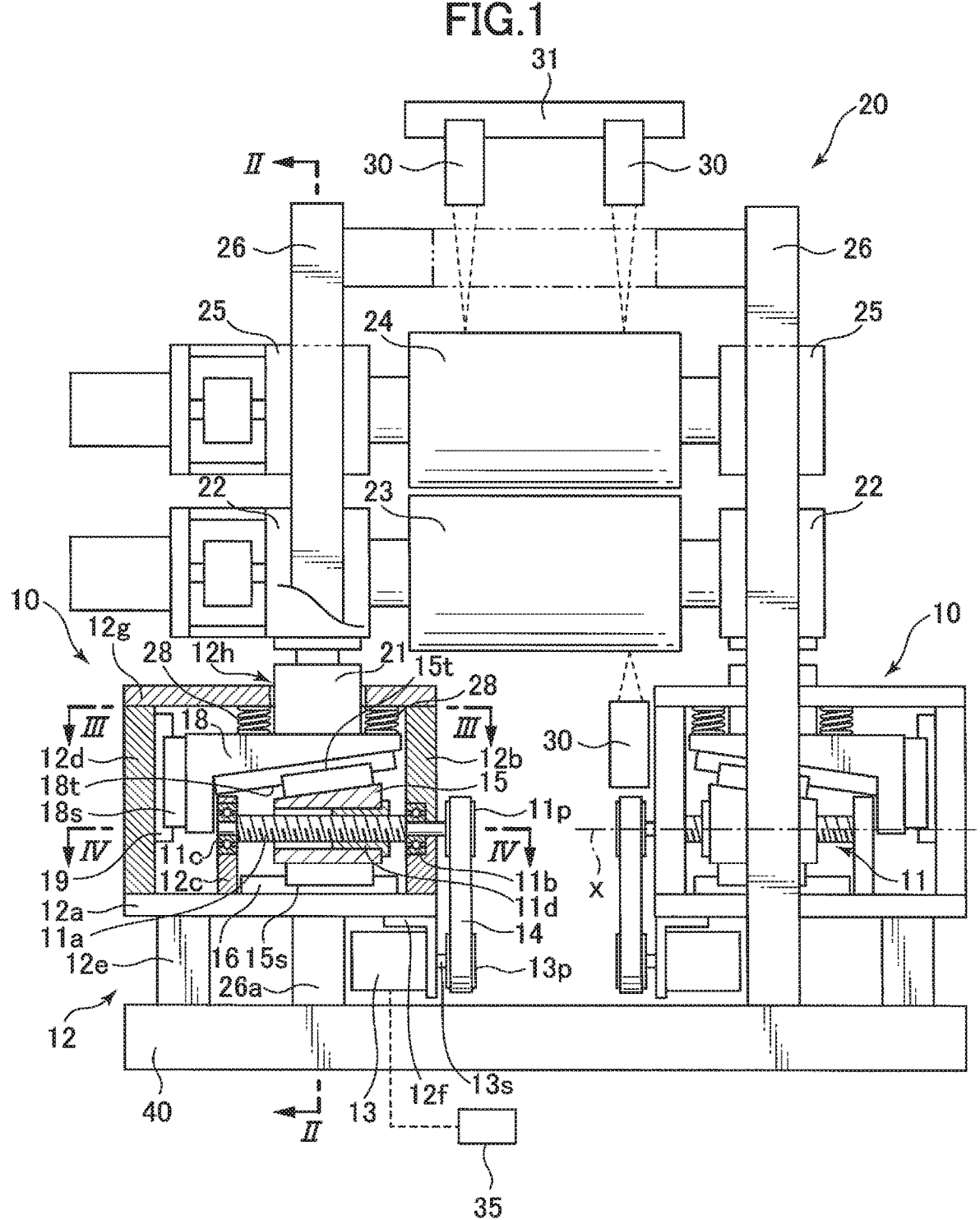
FIG. 1 is a schematic front view showing a roll press machine according to a first embodiment of the present invention.
Figure 2:
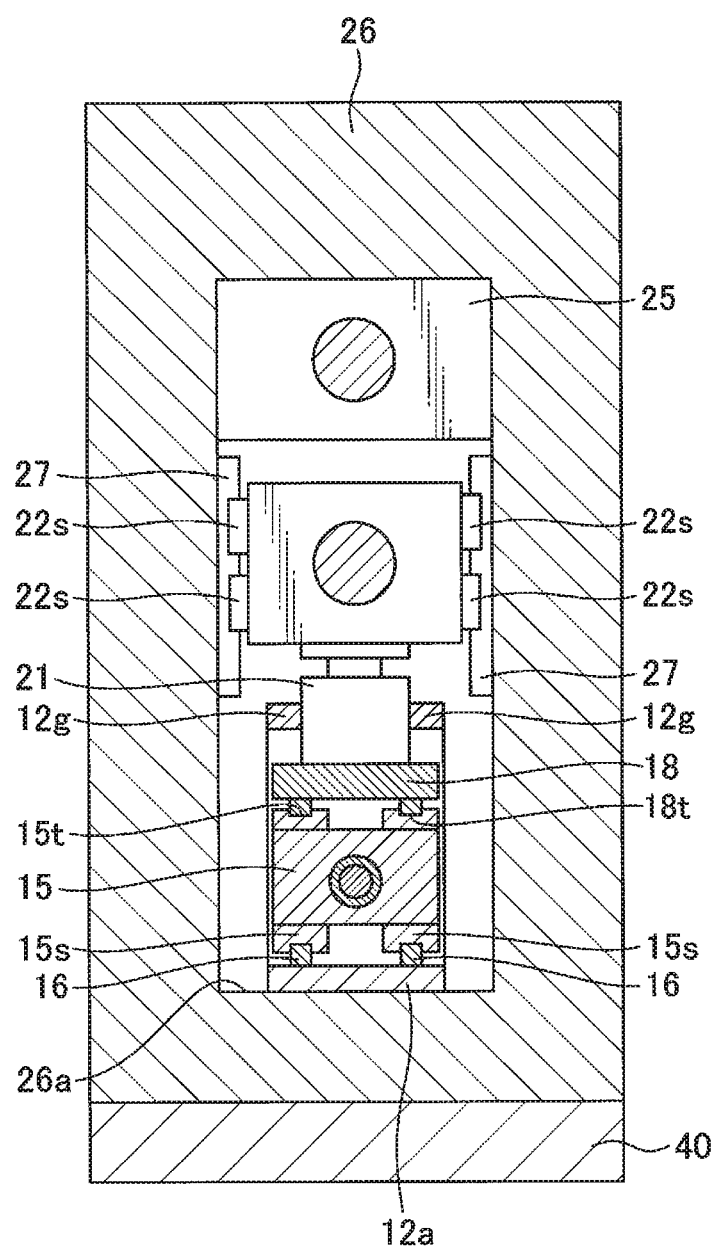
FIG. 2 is a section view taken along line II-II of the roll press machine shown in FIG. 1.
Figure 3:
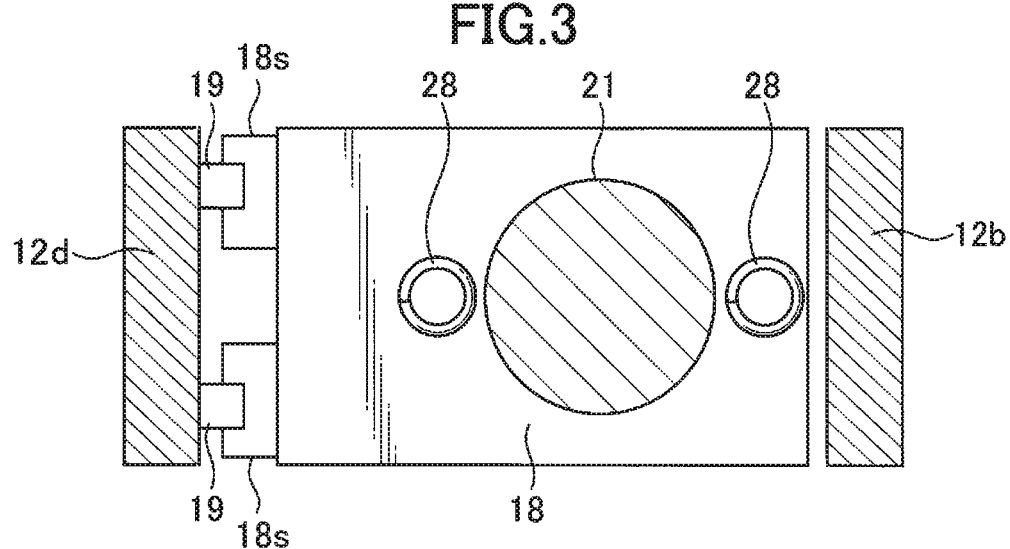
FIG. 3 is a section view taken along line III-III of the roll press machine shown in FIG. 1.
Figure 4:
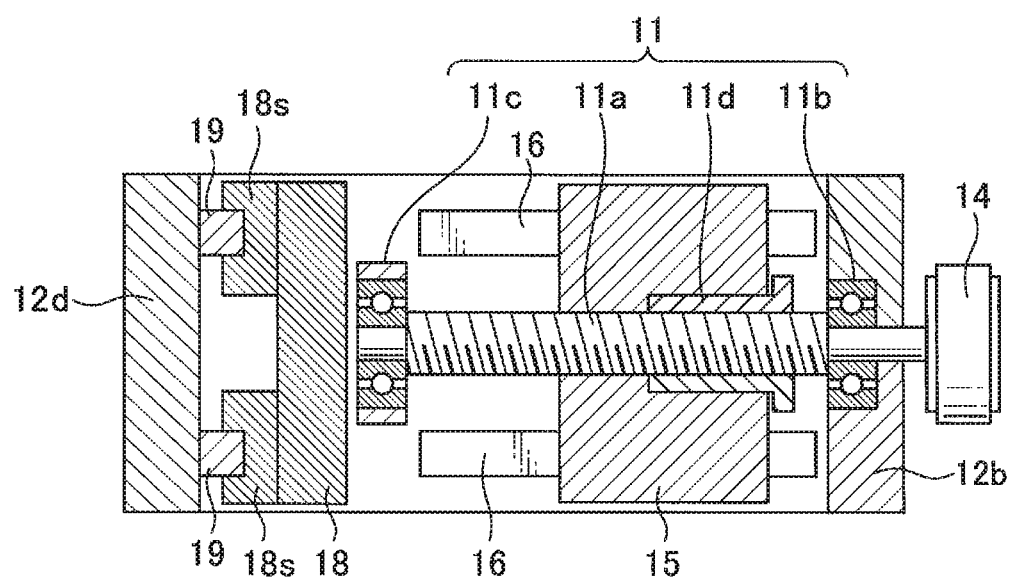
FIG. 4 is a section view taken along line IV-IV of the roll press machine shown in FIG. 1.

FIG. 1 is a schematic front view showing a roll press machine 20 according to a first embodiment of the present invention, FIG. 2 is a section view taken along line II-II of the roll press machine 20 shown in FIG. 1, FIG. 3 is a section view taken along line III-III of the roll press machine 20 shown in FIG. 1, and FIG. 4 is a section view taken along line IV-IV of the roll press machine 20 shown in FIG. 1. As shown in FIGS. 1 and 2, the roll press machine 20 of the present embodiment has a pair of electric lifting apparatuses 10. At first, with reference to FIG. 1, the electric lifting apparatus 10 is explained.

[Structure of Electric Lifting Apparatus]

The electric lifting apparatus 10 of the present embodiment includes a ball screw 11. The ball screw 11 has: a threaded shaft 11a having an axis x; a pair of bearings 11b, 11c provided at both end parts of the threaded shaft 11a and configured to support the threaded shaft 11a in such a manner that the threaded shaft 11a is rotatable around the axis x; and a nut 11d threadedly engaged with the threaded shaft 11a via a plurality of rolling elements (not shown) in such a manner that the nut 11d moves linearly in a direction of the axis x when the threaded shaft 11a rotates.

The axis x of the threaded shaft 11a is parallel to an axis of a lower roll 23 (one side roll) and an axis of an upper roll 24 (the other side roll), which are described below. The bearing 11b on the roll side (on the inner side) is buried in (supported by) an inside frame wall 12b. The bearing 11c on the opposite side (on the outer side) is buried in (supported by) a central frame wall 12c. The inside frame wall 12b and the central frame wall 12c are erected on an upper surface of a plate-like frame bottom plate 12a. An outside frame wall 12d is provided to face the inside frame wall 12b. The outside frame wall 12d is also erected on the upper surface of the frame bottom plate 12a. A frame ceiling plate 12g provided with an opening 12h, through which a load cell extends, is laid on across the inside frame wall 12b and outside frame wall 12d.

A substantially central part of a lower surface of the frame bottom plate 12a is supported by a lower part 26a of a roll frame 26 (see FIG. 2), which is described below. An outside part of the lower surface of the frame bottom plate 12a is fixed to a quadrangular prism 12e, which is erected on a base 40. Thus, the frame bottom plate 12a is fixed to the base 40. In addition, an electric motor mounting plate 12f, which has a L-shaped section, is fixed to a part of the lower surface of the frame bottom plate 12a directly below the inside frame wall 12b.

A frame 12 is formed by the frame bottom plate 12a, the inside frame wall 12b, the central frame wall 12c, the outside frame wall 12d, the quadrangular prism 12e, the electric motor mounting plate 12f and the frame ceiling plate 12g. These components of the frame 12 may be integrally formed, or may be separately formed and subsequently fixed to each other.

As an example, when a lifting force (pressing force) of the electric lifting apparatus 10 is 300 kN as a nominal value (600 kN for a pair of right and left ones) and a diameter of each roll is 450 mm, a size of each of the frame bottom plate 12a and the frame ceiling plate 12g is 50 cm (length seen in FIG. 1)×40 cm (length seen in FIG. 2) in a plan view, and a thickness thereof is about 6 cm. A size of the quadrangular prism 12e is 10 cm×40 cm in a plan view, and a height thereof is the same as that of the lower part 26a of the frame 26. A wall thickness of each of the inside frame wall 12b and the outside frame wall 12d is about 6 cm, and a height thereof is about 30 cm. A wall thickness of the central frame wall 12c is about 5 cm, and a height thereof is about 15 cm.

As shown in FIG. 1, an electric motor 13 having an output shaft 13s being rotatable (preferably a servomotor) is fixed to the electric motor mounting plate 12f. The output shaft 13s of the electric motor 13 is parallel with the axis x of the threaded shaft 11a of the ball screw 11, and they are overlapped with each other in a plan view. Thereby, the electric lifting apparatus 10 is made compact significantly.

At the time of filing the present application, the present invention is not limited to a manner in which the output shaft 13s of the electric motor 13 and the axis x of the threaded shaft 11a of the ball screw 11 are completely overlapped with each other in a plan view, but includes a manner in which the output shaft 13s of the electric motor 13 and the axis x of the threaded shaft 11a of the ball screw 11 are only partially overlapped with each other in a plan view. The degree of the compactness depends on the degree of the overlapping.

Referring back to FIG. 1, the output shaft 13s of the electric motor 13 extends through a suspended part of the electric motor mounting plate 12f, and is protruded inside the frame 12 and fixed to a motor side pulley 13p. On the other hand, the threaded shaft 11a of the ball screw 11 has a protruded part, which extends outward through the bearing 11b on the roll side (on the inner side) and is fixed to a threaded-shaft side pulley 11p. A belt 14 is laid on around the motor side pulley 13p and the threaded-shaft side pulley 11p.

As an example, the motor side pulley 13p and the threaded-shaft side pulley 11p have a diameter of about 8 cm to 12 cm in common. In addition, the motor side pulley 13p and the threaded-shaft side pulley 11p have a width (thickness) of about 4 cm in common. A width of the belt 14 is slightly narrower than this width and is about 3.5 cm for example. A length of the belt 14 depends on a distance between the axis x of the threaded shaft 11a and the output shaft 13s of the electric motor 13 and is about 70 to 80 cm for example. In some cases, a reduction gear may be formed by increasing the number of teeth of the threaded-shaft side pulley 11p with respect to the number of teeth of the motor side pulley 13p.

The motor side pulley 13p, the threaded-shaft side pulley 11p and the belt 14 are configured to function as a rotational force transferring mechanism which transfers a rotational force of the output shaft 13s to a rotational force of the threaded shaft 11a. Specifically, such a rotational force transferring mechanism may consist of: toothed pulleys and a toothed belt, timing pulleys and a timing belt, or any other combination. As clearly seen from FIG. 1, the belt 14 is configured to circulate on a circulating track which extends in a plane perpendicular to the output shaft 13s and the axis x of the threaded shaft 11a.

A first moving body 15 is fixed to the nut 11d of the ball screw 11 and is movable integrally with the nut 11d. The first moving body 15 has a first sliding surface 15t inclined at a predetermined angle with respect to a plane including the direction of the axis x of the threaded shaft 11a.

In the present embodiment, as shown in FIG. 2, two first sliding surfaces 15t are provided, and the two first sliding surfaces 15t are arranged on both sides with respect to the threaded shaft 11a and at predetermined distances from the threaded shaft 11a in a horizontal direction perpendicular to both the direction of the axis x and a vertical direction. Each of the two first sliding surfaces 15t is parallel with the direction of the axis x of the threaded shaft 11a in a plan view.

In addition, in the present embodiment, as clearly seen from FIG. 1, the threaded shaft 11a extends through the first moving body 15 in the direction of the axis x. The pair of bearings 11b, 11c is arranged on both sides of the first moving body 15.

A first sliding guide 16, which extends in parallel with the direction of the axis x, is provided on the upper surface of the frame bottom plate 12a. The first moving body 15 is provided with a first sliding part 15s which is slidably movable relative to the first sliding guide 16.

In the present embodiment, as shown in FIGS. 2 and 4, two pairs of the first sliding guide 16 and the first sliding part 15s are provided, and the two pairs of the first sliding guide 16 and the first sliding part 15s are arranged on both sides with respect to the threaded shaft 11a and at predetermined distances from the threaded shaft 11a in the horizontal direction perpendicular to both the direction of the axis x and the vertical direction. The sliding surfaces of the first sliding guide 16 and the first sliding part 15s extend in parallel with the direction of the axis x of the threaded shaft 11a in a plan view.

In addition, the electric lifting apparatus 10 according to the present embodiment has a second moving body 18 arranged to be movable linearly in a direction perpendicular to the direction of the axis x with respect to the frame 12. The second moving body 18 has two second sliding surfaces 18t, which are slidably movable relative to the two first sliding surfaces 15t, respectively. Thereby, the second moving body 18 is caused to move linearly in the above perpendicular direction by a sliding movement between the two first sliding surfaces 15t and the two second sliding surfaces 18t when the nut 11d and the first moving body 15 moves linearly in the direction of the axis x. Herein, in the present embodiment, as shown in FIG. 2, it can be said that there are two pairs of the first sliding surface 15t and the second sliding surface 18t, and that the two pairs are arranged on both sides with respect to the threaded shaft 11a and at predetermined distances from the threaded shaft 11a in the horizontal direction perpendicular to both the direction of the axis x and the vertical direction.

It is preferable that the pairs of the first sliding surface 15t and the second sliding surface 18t are arranged symmetrically with respect to the threaded shaft 11a. In this case, a linear movement (horizontal movement) of the first moving body 15 can be converted to a linear movement (up and down movement) of the second moving body 18 in a well-balanced manner. A load (reaction force) received by the second moving body 18 can be also supported by the base 40 via the first moving body 15t and so on in a well-balanced manner.

As a specific structural example, each pair of the first sliding surface 15t and the second sliding surface 18t may be provided by a general linear guide. That is to say, with reference to FIG. 2, the first sliding surface 15t may be provided as a concave surface, whose section has a concave shape, of a member which is called "block" of the linear guide, and the second sliding surface 18t may be provided as a lower surface, whose section has a rectangular shape, of a member which is called "rail" of the linear guide. For example, commercially available two linear guides may be disassembled, and subsequently two "blocks" thereof may be fixed to an upper surface of a main body of the first moving body 15 and two "rails" thereof may be fixed to a lower surface of a main body of the second moving body 18, which may result in that the two pairs are arranged.

A second sliding guide 19 extending in the above perpendicular direction (the direction perpendicular to the direction of the axis x) is provided on an inside surface of the outside frame wall 12d. The second moving body 18 is provided with a second sliding part 18s which is slidably movable relative to the second sliding guide 19.

In the present embodiment, as shown in FIGS. 3 and 4, two pairs of the second sliding guide 19 and the second sliding part 18s are provided, and the two pairs of the second sliding guide 19 and the second sliding part 18s are arranged on both sides with respect to the threaded shaft 11a and at predetermined distances from the threaded shaft 11a in the horizontal direction perpendicular to both the direction of the axis x and the vertical direction.

In addition, in the present embodiment, a load cell 21 is provided on an upper surface of the second moving body 18. The load cell 21 is configured to be movable up and down through the opening 12h of the frame ceiling plate 12g.

Coil springs 28, each of which has been always compressed (correspondingly to a load of about 10 kN), are inserted between the upper surface of the second moving body 18 and a lower surface of the frame ceiling plate 12g at inside and outside positions adjacent to the load cell 21.

Herein, the predetermined angle may be selected within a range of 5.7 degrees to 11.3 degrees. The "5.7 degrees" is the solution of $\tan \theta = 1/10$. The "11.3 degrees" is the solution of $\tan \theta = 1/5$. Thus, a leverage ratio (lever mechanism ratio) of 5 to 10 times can be achieved.

Through the practical verification experiments carried out by the present inventors, it has been confirmed that the electric lifting apparatus 10 of the present embodiment is effectively operable within the above angle range.

A moving stroke of the second moving body 18 may be 1 mm, which is enough for an application as described below (an application in which a material in which a plurality of electrode layers having been baked on a metal foil is used as a work W).

A moving speed of the second moving body 18 may be 10 mm/sec, for example, which corresponds to a moving speed of the first moving body 15 (i.e., the nut 11*d*) of 50 mm/sec when the leverage ratio is 5 times, or a moving speed of the first moving body 15 (i.e., the nut 11*d*) of 100 mm/sec when the leverage ratio is 10 times. Such a moving speed of the nut 11*d* can be achieved by a commercially available general electric motor 13 and a commercially available general ball screw 11. In particular, when the electric motor 13 is a servomotor, a control with higher precision and higher responsivity can be achieved.

[Operation of Electric Lifting Apparatus 10]

Next, an operation of the electric lifting apparatus 10 of the present embodiment is explained.

When the electric motor 13 is driven in a desired manner (for example, the electric motor 13 may be controlled by a controlling device 35 as described below), the output shaft 13*s* of the electric motor 13 rotates. Subsequently, the motor side pulley 13*p*, the threaded-shaft side pulley 11*p* and the belt 14 function as a rotational force transferring mechanism, so that a rotational force of the output shaft 13*s* is transferred to a rotational force of the threaded shaft 11*a*. Subsequently, a rotation of the threaded shaft 11*a* is converted to a linear movement of the nut 11*d* in the direction of the axis x by a converting function of the ball screw 11 between the rotational movement and the linear movement.

Thereby, the first moving body 15 fixed to the nut 11*d* moves linearly in the direction of the axis x. Herein, the linear movement of the first moving body 15 in the direction of the axis x is smoothly achieved because of an interaction between the first sliding guide 16 and the first sliding part 15*s* (a facilitating action of a smooth sliding movement).

Subsequently, when the nut 11*d* and the first moving body 15 move linearly in the direction of the axis x, the second moving body 18 moves linearly in the direction perpendicular to the direction of the axis x, by a sliding movement between the first sliding surface 15*t* and the second sliding surface 18*t*. Herein, the linear movement of the second moving body 18 is smoothly achieved because of an interaction between the second sliding guide 19 and the second sliding part 18*s* (a facilitating action of a smooth sliding movement).

If the pairs of the first sliding surface 15*t* and the second sliding surface 18*t* are arranged symmetrically with respect to the threaded shaft 11*a*, the linear movement (horizontal movement) of the first moving body 15 can be converted to the linear movement (up and down movement) of the second moving body 18 in a well-balanced manner, and a load (reaction force) received by the second moving body 18 can be also supported by the base 40 via the first moving body 15*t* and so on in a well-balanced manner.

In short, when the electric motor 13 is driven in a desired manner, the movement of the second moving body 18 can be controlled in a desired manner with high precision. In particular, when the electric motor 13 is a servomotor, a control with higher precision and higher responsivity can be achieved.

In particular, since the compressed coil springs 28 always press the ball screw 11 toward the side of the bearings 11*b*, 11*c*, it is possible to remove the effects by backlash which might be caused in the ball screw 11, so that a lifting control with higher precision can be achieved.

In addition, because of a cushion action of the belt 14, it is possible to mitigate a shock which might be transferred to the electric motor 13 via the threaded shaft 11*a*.

[Effects of Electric Lifting Apparatus 10]

As described above, according to the electric lifting apparatus 10 of the present embodiment, the rotational force of the output shaft 13*s* of the electric motor 13 is used as the rotational force of the threaded shaft 11*a* of the ball screw 11, and the second moving body 18 moves linearly in the direction perpendicular to the direction of the axis x when the first moving body 15 fixed to the nut 11*d* of the ball screw 11 moves linearly in the direction of the axis x. Thereby, the movement of the second moving body 18 can be controlled with high precision by the electric motor 13.

In addition, according to the electric lifting apparatus 10 of the present embodiment, since the threaded shaft 11*a* extends through the first moving body 15 in the direction of the axis x and the pair of bearings 11*b*, 11*c* is arranged on the both sides of the first moving body 15, the whole electric lifting apparatus 10 is compact. In addition, according to the electric lifting apparatus 10 of the present embodiment, as seen in the direction in which the second moving body 18 is linearly movable, the electric motor 13 and the threaded shaft 11*a* are completely overlapped with each other along the direction of the axis x. This also contributes to making the whole electric lifting apparatus 10 compact. Furthermore, since a hydraulic system is not adopted, i.e., since there is no concern about pollution of the surrounding by oil, the electric lifting apparatus 10 of the present embodiment is suitable to be displaced in a glove box.

In addition, according to the electric lifting apparatus 10 of the present embodiment, the rotational force transferring mechanism, which transfers the rotational force of the output shaft 13*s* as the rotational force of the threaded shaft 11*a*, has the belt 14 laid on around the motor side pulley 13*p* of the output shaft 13*s* and the threaded-shaft side pulley 11*p* of the threaded shaft 11*a* in such a manner that the belt 14 circulates on the circulating track which extends in the plane perpendicular to the output shaft 13*s* and the axis x of the threaded shaft 11*a*. According to this arrangement, the rotational force transferring mechanism is compact, and thus the whole electric lifting apparatus 10 is more compact. Thus, the electric lifting apparatus 10 according the present embodiment is more suitable to be displaced in a glove box.

In addition, according to the electric lifting apparatus 10 of the present embodiment, the pair of bearings 11*b*, 11*c* for the threaded shaft 11*a* is arranged at the both end parts of the threaded shaft 11*a*, and the belt 14 is laid over the protruded part of the threaded shaft 11*a* which extends outward through the one bearing 11*b*. According to this arrangement, the whole electric lifting apparatus 10 is more compact, and thus the electric lifting apparatus 10 according the present embodiment is much more suitable to be displaced in a glove box.

In addition, according to the electric lifting apparatus 10 of the present embodiment, the frame 12 is provided with the first sliding guide(s) 16 which extends in parallel with the direction of the axis x, and the first moving body 15 is provided with the first sliding part(s) 15*s* which is slidably movable relative to the first sliding guide(s) 16. Thereby, because of the interaction therebetween (the facilitating action of the smooth sliding movement), the movement of the first moving body 15 in the direction of the axis x is more smoothly achieved.

In addition, according to the electric lifting apparatus 10 of the present embodiment, the two pairs of the first sliding surface 15t and the second sliding surface 18t are provided on the both sides with respect to the threaded shaft 11a and at the predetermined distances from the threaded shaft 11a in the horizontal direction perpendicular to both the direction of the axis x and the vertical direction. According to this feature, during a roll press operation, when a reaction force or the like exerted on the second moving body 18 is transferred to the first moving body 15 via the pairs of the first sliding surface 15t and the second sliding surface 18t, a load which the ball screw 11 directly receives can be reduced. Thereby, it is possible to remarkably reduce a possibility that malfunction will occur in the ball screw 11.

Furthermore, according to the electric lifting apparatus 10 of the present embodiment, the two pairs of the first sliding guide 16 and the first sliding part 15s are also provided on the both sides with respect to the threaded shaft 11a and at the predetermined distances from the threaded shaft 11a in the horizontal direction perpendicular to both the direction of the axis x and the vertical direction. According to this feature as well, during a roll press operation, when a reaction force or the like exerted on the second moving body 18 is transferred to the first moving body 15 via the pairs of the first sliding surface 15t and the second sliding surface 18t, a load which the ball screw 11 directly receives can be reduced. Thereby, it is possible to remarkably reduce a possibility that malfunction will occur in the ball screw 11.

In addition, according to the electric lifting apparatus 10 of the present embodiment, the frame 12 is provided with the second sliding guide(s) 19 which extends perpendicularly to the direction of the axis x, and the second moving body 18 is provided with the second sliding part(s) 18s which is slidably movable relative to the second sliding guide(s) 19. Thereby, because of the interaction therebetween (the facilitating action of the smooth sliding movement), the movement of the second moving body 18 in the direction perpendicular to the direction of the axis x is more smoothly achieved.

[Structure of Roll Press Machine 20]

With reference to FIGS. 1 and 2, a structure of a roll press machine 20 according to an embodiment is explained.

The roll press machine 20 according to the present embodiment includes a pair of the above described electric lifting apparatuses 10. A pair of lower roll supporting bodies 22 (one side roll supporting parts) are respectively supported by the pair of second moving bodies 18 of the pair of electric lifting apparatuses 10. Each of the pair of lower roll supporting bodies 22 is placed on the corresponding second moving body 18 via the load cell 21. The pair of lower roll supporting bodies 22 has bearings configured to support a lower roll 23 in such a manner that the lower roll 23 is rotatable.

An upper roll 24 is arranged opposite to the lower roll 23. A press forming (consolidating) of a work W is carried out by using a gap formed between the lower roll 23 and the upper roll 24.

The upper roll 24 is supported by a pair of upper roll supporting bodies 25 (the other side roll supporting parts) in such a manner that the upper roll 24 is rotatable. Each of the pair of upper roll supporting bodies 25 is fixed to each of a pair of roll frames 26 provided on the base 40, for example via bolt screws or the like not shown from outside.

In addition, as shown in FIG. 2, a pair of opposite third sliding guides 27, each of which extends perpendicularly to the direction of the axis x, are provided on opposite inside surfaces of each roll frame 26, and each of the pair of lower roll supporting bodies 22 is provided with pairs of opposite third sliding parts 22s which are slidably movable relative to the opposite third sliding guides 27. In addition, the lower part 26a of the roll frame 26 fixes the frame bottom plate 12a of the electric lifting apparatus 10 to the base 40. Thereby, a part of the electric lifting apparatus 10 is inserted in an opening of the roll frame 26, so that the whole apparatus layout is made compact.

According to the above structure, the pair of electric lifting apparatuses 10 is configured to function as a moving apparatus for causing the lower roll supporting bodies 22 and the upper roll supporting bodies 25 to move relative to each other by using the electric motors 13, to control the gap between the lower roll 23 and the upper roll 24.

Referring back to FIG. 1, four displacement sensors 30 are provided for measuring local displacements at predetermined positions of the lower roll 23 and the upper roll 24, for example at positions 30 mm away from their left and right ends (only three of them are shown in FIG. 1). The displacement sensors 30 are fixed to the base 40 via a displacement sensor frame 31, which is different from the roll frame 26. The displacement sensors 30 are connected to the controlling device 35 for controlling the electric motors 13. The displacement sensors 30 of the present embodiment are specifically non-contact type displacement gauges.

As an example, the lower roll 23 and the upper roll 24 have a diameter of about 30 to 50 cm in common, and a length (width) of about 15 to 50 cm in common in the direction of the axis x. The whole size of the roll press machine 20 is within 180 cm in height×150 cm in width (×90 cm in depth).

[Basic Operation of Roll Press Machine 20]

A basic operation of the roll press machine 20 of the present embodiment is explained.

As a basic operation, the respective electric motors 13 of the pair of electric lifting apparatuses 10 are driven in a desired matter, so that the positions of the second moving bodies 18 are controlled in a desired manner with high precision, and thus the respective positions of the pair of lower roll supporting bodies 22 are controlled in a desired manner with high precision.

Thereby, the dimension of the gap formed between the lower roll 23 and the upper roll 24 can be controlled in a desired manner with high precision. Therefore, thickness precision of a press-formed work W can be maintained constant with high precision.

[Specific Example of Work W]

Figure 5:
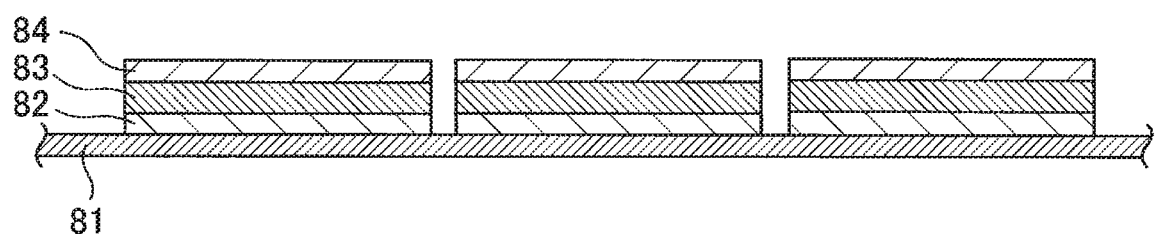
FIG. 5 is a section view showing an example of work.

Herein, a material in which a plurality of electrode layers (broad concept including solid electrolyte layers) having been baked on a metal foil is assumed as a work W. Specifically, as shown in FIG. 5 for example, a copper foil 81 intended to function as a cathode is used as a base material, and a cathode layer 82, a solid electrolyte layer 83 and an anode layer 84 are formed thereon in this order from the bottom. Alternatively, an aluminum foil intended to function as an anode may be used as a base material, and an anode layer, a solid electrolyte layer and a cathode layer may be formed thereon in this order from the bottom. The plurality of electrode layers are applied and/or baked intermittently on a continuous metal foil, so that discrete works W are formed (see FIGS. 5 and 7).

A thickness of the material is 0.38 mm, for example, before a press-forming (consolidating). It is intended to reduce the thickness to 0.34 mm by a press-forming (consolidating) to remove or reduce spaces between the electrode layers as well as spaces in the respective electrode layers. In this case, taking into consideration a spring back of the material, it is preferable that the size of the gap formed between the lower roll 23 and the upper roll 24 at a press-forming (consolidating) is set to 0.25 to 0.3 mm.

According to verification results by the present inventors, when the purpose is to remove or reduce the spaces between the electrode layers and the spaces in the respective electrode layers by press-forming the material in which the plurality of electrode layers having been baked on the metal foil, it is effective to set the gap (which is also called "consolidation gap" in the specification) formed between the lower roll 23 and the upper roll 24 at a press-forming (consolidating) to a constant value within a range of 70% to 90% of the thickness of the work W before the consolidation.

In addition, according to further verification results by the present inventors, when the purpose is to remove or reduce the spaces between the electrode layers and the spaces in the respective electrode layers by press-forming the material in which the plurality of electrode layers having been baked on the metal foil, it is also effective to set a feed speed of the work W to a value within a range of 1 mm/sec to 100 mm/sec and to carry out an intermittent roll press operation by fluctuating the consolidation gap within a range of 70% to 110% of the thickness of the work W before the consolidation with a frequency of 1 Hz to 10 Hz (1 to 10 times a second) in order to generate impact loads. In this case, it is possible to reduce power consumption with respect to a compression rate. That is to say, it is possible to obtain energy saving effects.

As a specific example, when the thickness of the material is 0.38 mm before a press-forming (consolidating) and it is intended to reduce the thickness to 0.34 mm by a press-forming (consolidating) to remove or reduce the spaces between the electrode layers and the spaces in the respective electrode layers, it is effective to fluctuate the size of the gap formed between the lower roll 23 and the upper roll 24 at a press-forming (consolidating) within a range of 0.27 mm to 0.42 mm with a frequency of 1 Hz to 10 Hz (1 to 10 times a second) (in a case wherein the feed speed of the work W is within a range of 1 mm/sec to 100 mm/sec).

In detail, the fluctuation of the size of the gap with respect to time may be like a rectangular pulse, like a sawtooth wave, or like a sinusoidal wave.

According to verification results by the present inventors, when the fluctuated value as described above is adopted as the consolidation gap (when an intermittent roll press operation is carried out), it has been confirmed that power consumption with respect to a compression rate, at which the material is compressed by the press-forming (consolidating), can be reduced by about 10%, compared with a case wherein a constant value is adopted as the consolidation gap.

[Displacement Compensation of Roll Press Machine 20]

At a press forming (consolidating), because of a reaction from the work W, the upper roll 24 (together with the upper roll supporting body 25 supporting the upper roll 24) is going to deflect upward, and the lower roll 23 (together with the lower roll supporting body 22 supporting the lower roll 23) is going to deflect downward. This situation is shown in FIG. 6 by a one-dot chain line.

Figure 6:
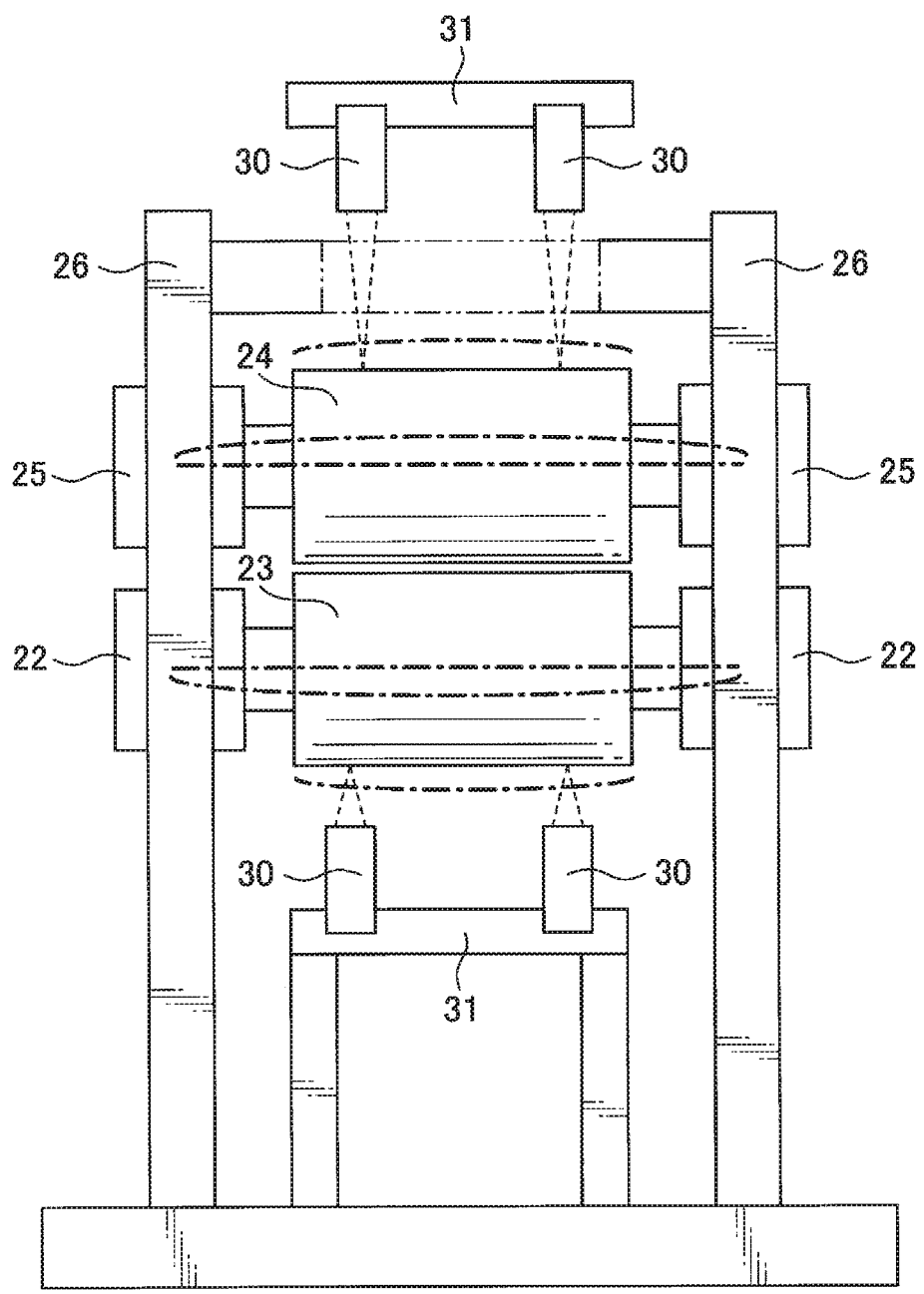
FIG. 6 is an explanatory view of displacement sensors of the roll press machine according to the present embodiment.

In the roll press machine 20 of the present embodiment, as shown in FIGS. 1 and 6, four displacement sensors 30 are provided to enable to take measures against (compensate for) generation of the deflection (displacement). That is to say, the controlling device 35 carries out a control taking into consideration the displacements of the upper roll 24 and the lower roll 23, based on respective measurement results of the four displacement sensors 30. In detail, for example, a further "push control" may be carried out depending on the displacements of the upper roll 24 and the lower roll 23.

In the roll press machine 20 of the present embodiment, since the displacement sensor frame 31 supporting the displacement sensors 30 is different from the roll frame 26, the mounted positions of the displacement sensors 30 are not affected by deflection of the various elements (the lower roll 23, the upper roll 24, the lower roll supporting body 22, the upper roll supporting body 25) at a press-forming (consolidating). Thereby, measurements by the displacement sensors 30 and thus a feedback control based on the measurement results can be carried out with high precision.

[Load Monitoring/Load Control of Roll Press Machine 20]

In the roll press machine 20 of the present embodiment, the lower roll supporting bodies 22 are placed on the second moving bodies 18 of the electric lifting apparatuses 10 via the load cells 21. By monitoring values of the load cells 21, it is possible to monitor occurrence of an abnormal load at the lower roll 23 and/or the upper roll 24, for example.

Furthermore, by connecting the load cells 21 to the controlling device 35, it is also possible to carry out a load control using measurement results of the load cells 21. For example, by setting a target load value or a target load range in advance, it is possible to carry out a feedback control based on the target load value or the target load range.

[Structure of Roll Press Machine 50]

Figure 7:
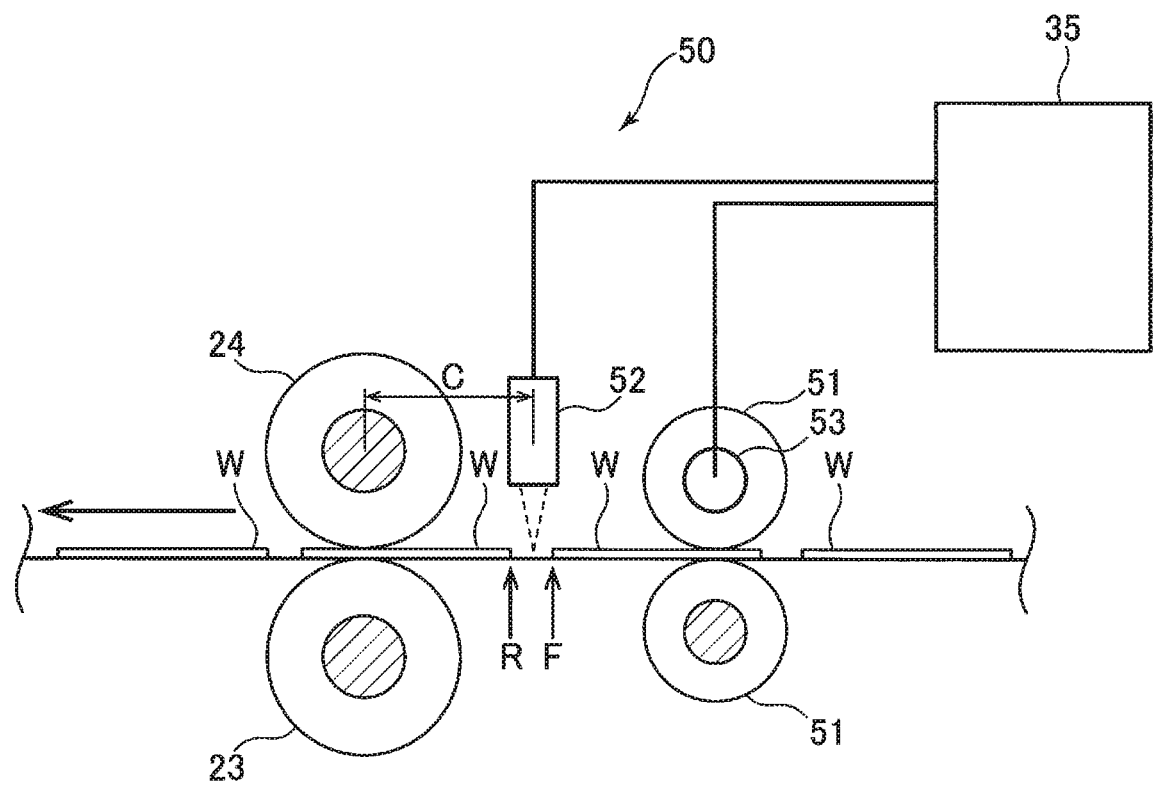
FIG. 7 is a schematic view showing a roll press machine according to a second embodiment of the present invention.

Next, FIG. 7 is a schematic view of a roll press machine 50 according to a second embodiment of the present invention. In the roll press machine 50 of the present embodiment, components described below are added to the roll press machine 20 of the first embodiment. In FIG. 7, except for the lower roll 23 and the upper roll 24, the components of the roll press machine 20 of the first embodiment are not shown. In addition, in the present embodiment, each of the lower roll 23 and the upper roll 24 is configured to be driven by a servomotor.

As shown in FIG. 7, the added components in the present embodiment are: feed rolls 51 as a work supplying device that supplies a work W through the gap between the lower roll 23 and the upper roll 24; and a position sensor 52 configured to detect a position of a front edge of the work W supplied into the gap by the feed rolls 51. The position sensor 52 is connected to the controlling device 35. The feed rolls 51 are also configured to be driven by servomotors.

Specifically, the position sensor 52 of the present embodiment is a non-contact type displacement gauge disposed at a position of a predetermined basic distance C away from the narrowest position of the gap (corresponding to axes of the lower roll 23 and the upper roll 24). For example, the position sensor 52 is a laser type position sensor. When the front edge F of the work W (see FIG. 7) passes through a detection positon of the position sensor 52, an output of the position sensor 52 is changed depending on a change of the thickness of the work W. Through the detection of the change, it is possible to detect when the front edge F of the work W arrives at the detection position of the position sensor 52. That is to say, it is possible to detect a position of the front edge F of the work W. Alternatively, the position sensor 52 may be a sensor for judging a color of the work W. Through the judgment of the color of the uppermost electrode or the like of the work W as well, it is possible to detect when the front edge F of the work W arrives at the detection position of the position sensor 52. That is to say, it is possible to detect a position of the front edge F of the work W.

On the other hand, if the feed speed of the work W by the feed rolls 51 is obtained, the front edge F of the work W arrives at the narrowest position of the gap at a timing when a time period obtained by dividing the predetermined basic distance C by the feed speed has passed after the front edge F of the work W arrived at the detection position of the position sensor 52. The feed speed of the work W may be obtained from information about a driving system for the feed rolls 51, or may be measured by an encoder 53 provided on the feed rollers 51.

The present inventors have found that, at a press-forming for the material in which the plurality of electrode layers having been baked on the metal foil, when the material is supplied as a work W into the gap between the lower roll and the upper roll for consolidating, a concentrated load may be generated at a front edge of the work W. In that case, chipping or crackling may be caused at the material (at the front edge of the material).

Furthermore, the present inventors have found that, it is remarkably effective to set the gap to the consolidation gap only after the front edge F of the work W has passed through the narrowest position of the gap by a first predetermined distance, i.e., to maintain the gap larger than the consolidation gap (and larger than the thickness of the work W) until the front edge F of the work W has passed through the narrowest position of the gap by the first predetermined distance, in order to prevent the chipping or crackling at the material (at the front edge of the material). Preferably, the first predetermined distance is selected within a range of 0.001 mm to 3.000 mm, more preferably within a range of 1 mm to 3 mm, although it may depend on the type and/or the thickness of the material.

Based on these findings, the controlling device 35 of the present embodiment controls the electric motors 13 of the electric lifting apparatuses 10 based on the detection results by the position sensor 52 and the feed speed of the work W by the feed rolls 51 obtained in advance in such a manner that the gap is set to the consolidation gap at a timing when the front edge F of the work W has passed through the narrowest position of the gap by the first predetermined distance, i.e., the gap is maintained larger than the consolidation gap (and larger than the thickness of the work W) until the front edge F of the work W has passed through the narrowest position of the gap by the first predetermined distance.

In addition, the present inventors have also found that, at a press-forming for the material in which the plurality of electrode layers having been baked on the metal foil, when the material is moved out of the gap between the lower roll and the upper roll for consolidating, a concentrated load may be generated at the work W. In that case, chipping or crackling may be caused at the material.

Furthermore, the present inventors have found that, it is remarkably effective to maintain the gap to the consolidation gap until the rear edge R of the work W has arrived at a position of a second predetermined distance toward the narrowest position of the gap, and to set the gap larger than the consolidation gap (and larger than the thickness of the work W) at a timing when the rear edge R of the work W has arrived at the position of the second predetermined distance toward the narrowest position of the gap, in order to prevent the chipping or crackling at the material (at the edge of the material). Preferably, the second predetermined distance is also selected within a range of 0.001 mm to 3.000 mm, more preferably within a range of 1 mm to 3 mm, although it may depend on the type and/or the thickness of the material.

In the present embodiment, when the rear edge R of the work W (see FIG. 7) passes through the detection positon of the position sensor 52 as well, the output of the position sensor 52 is changed depending on a change of the thickness of the work W. Through the detection of the change, it is possible to detect when the rear edge R of the work W arrives at the detection position of the position sensor 52.

Based on these findings, the controlling device 35 of the present embodiment controls the electric motors 13 of the electric lifting apparatuses 10 based on the detection results by the position sensor 52 and the feed speed of the work W by the feed rolls 51 obtained in advance in such a manner that the gap is maintained to the consolidation gap until the rear edge R of the work W has arrived at the position of the second predetermined distance toward the narrowest position of the gap, and that the gap is set larger than the consolidation gap at a timing when the rear edge R of the work W has arrived at the position of the second predetermined distance toward the narrowest position of the gap.

In addition, in the present embodiment, since the lower roll 23 and the upper roll 24 are driven by servomotors, it is possible to synchronize them to the feed roils 51 with high precision. Thereby, it is possible to achieve a feed control of the work W with high precision. Furthermore, when a thermal process is added to the lower roll 23 and the upper roll 24, the lower roll 23 and the upper roll 24 may be thermally deformed (in particular, diameters thereof may be changed). However, for example by using a temperature detection by a temperature sensor, an appropriate compensation control can be carried out.

[Operation of Roll Press Machine 50]

According to the roll press machine 50 of the present embodiment, it is detected by the position sensor 52 that the front edge F of the work W has arrived at the detection position of the position sensor 52. Then, based on the predetermined basic distance C, the first predetermined distance and the feed speed of the work W, the controlling device 35 controls the electric motors 13 of the electric lifting apparatuses 10 in such a manner that the gap is adjusted to the consolidation gap with high precision at a timing when the front edge F of the work W has passed through the narrowest position of the gap by the first predetermined distance. In other words, until the front edge F of the work W has passed through the narrowest position of the gap by the first predetermined distance, the gap is maintained larger than the consolidation gap (and larger than the thickness of the work W).

Thus, it is possible to effectively prevent generation of the concentrated load when the work W is supplied into the gap, and thus it is possible to effectively prevent generation of the chipping or crackling at the front edge portion of the work W.

In addition, according to the roll press machine 50 of the present embodiment, it is detected by the position sensor 52 that the rear edge R of the work W has arrived at the detection position of the position sensor 52. Then, based on the predetermined basic distance C, the second predetermined distance and the feed speed of the work W, the controlling device 35 controls the electric motors 13 of the electric lifting apparatuses 10 in such a manner the gap is maintained to the consolidation gap until the rear edge R of the work W has arrived at the position of the second predetermined distance toward the narrowest position of the gap, and that the gap is set larger than the consolidation gap at a timing when the rear edge R of the work W has arrived at the position of the second predetermined distance toward the narrowest position of the gap.

Thus, it is possible to effectively prevent generation of the concentrated load when the work W is moved out of the gap, and thus it is possible to effectively prevent generation of the chipping or crackling at the rear edge portion of the work W.

In the roll press machine 50 of the present embodiment as well, it is effective to set the consolidation gap to a constant value within a range of 70% to 90% of the thickness of the work W before the consolidation. Alternatively, it is also effective to set the feed speed of the work W to a value within a range of 1 mm/sec to 100 mm/sec and to carry out a cycling operation by fluctuating the consolidation gap within a range of 70% to 110% of the thickness of the work W before the consolidation with a frequency of 1 Hz to 10 Hz (1 to 10 times a second). In the latter case, it is possible to reduce power consumption with respect to a compression rate, at which the material is compressed by the press-forming (consolidating), by about 10%, as described above.

[Structure of Roll Press Machine 150]

Figure 8:
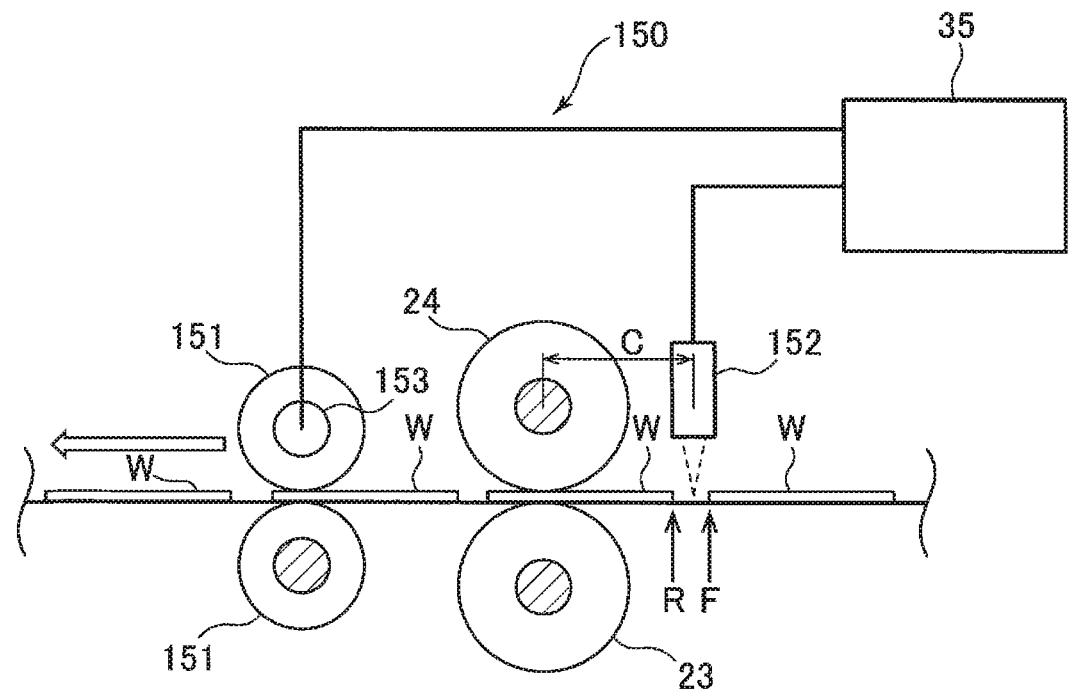
FIG. 8 is a schematic view showing a roll press machine according to a variation of the second embodiment of the present invention.

Next, FIG. 8 is a schematic view of a roll press machine 150, which is a variation of the roll press machine 50 according to the second embodiment of the present invention. In the roll press machine 150, components described below are added to the roll press machine 20 of the first embodiment. In FIG. 8 as well, except for the lower roll 23 and the upper roll 24, the components of the roll press machine 20 of the first embodiment are not shown. In addition, in the present variation as well, each of the lower roll 23 and the upper roll 24 is configured to be driven by a servomotor.

As shown in FIG. 8, the added components in the present variation are: feed rolls 151 as a work supplying device that supplies a work W through the gap between the lower roll 23 and the upper roll 24; and a position sensor 152 configured to detect a position of a front edge of the work W supplied into the gap by the feed rolls 151. The position sensor 152 is connected to the controlling device 35. The feed rolls 151 are also configured to be driven by servomotors.

In the roll press machine 50 shown in FIG. 7, the feed rolls 51 are disposed on an upstream side of the lower roll 23 and the upper roll 24 as seen in a work supplying direction. In contrast, in the roll press machine 150 of the present variation, the feed rolls 151 are disposed on a downstream side of the lower roll 23 and the upper roll 24.

Specifically, the position sensor 152 of the present variation as well as the position sensor 52 shown in FIG. 7 is a non-contact type displacement gauge disposed at a position of a predetermined basic distance C away from the narrowest position of the gap (corresponding to axes of the lower roll 23 and the upper roll 24). When the front edge F of the work W (see FIG. 8) passes through a detection positon of the position sensor 152, an output of the position sensor 152 is changed depending on a change of the thickness of the work W. Through the detection of the change, it is possible to detect when the front edge F of the work W arrives at the detection position of the position sensor 152. That is to say, it is possible to detect a position of the front edge F of the work W.

On the other hand, if the feed speed of the work W by the feed rolls 151 is obtained, the front edge F of the work W arrives at the narrowest position of the gap at a timing when a time period obtained by dividing the predetermined basic distance C by the feed speed has passed after the front edge F of the work W arrived at the detection position of the position sensor 152. The feed speed of the work W may be obtained from information about a driving system for the feed rolls 151, or may be measured by an encoder 153 provided on the feed rollers 151.

As described above for the roll press machine 50 of the second embodiment, the present inventors have found that, at a press-forming for the material in which the plurality of electrode layers having been applied on the metal foil, when the material is supplied as a work W into the gap between the lower roll and the upper roll for consolidating, a concentrated load may be generated at a front edge of the work W. In that case, chipping or crackling may be caused at the material (at the front edge of the material). Furthermore, the present inventors have found that, it is remarkably effective to set the gap to the consolidation gap only after the front edge F of the work W has passed through the narrowest position of the gap by a first predetermined distance, i.e., to maintain the gap larger than the consolidation gap (and larger than the thickness of the work W) until the front edge F of the work W has passed through the narrowest position of the gap by the first predetermined distance, in order to prevent the chipping or crackling at the material (at the front edge of the material). Preferably, the first predetermined distance is selected within a range of 0.001 mm to 3.000 mm, more preferably within a range of 1 mm to 3 mm, although it may depend on the type and/or the thickness of the material.

Based on these findings, the controlling device 35 of the present variation controls the electric motors 13 of the electric lifting apparatuses 10 based on the detection results by the position sensor 152 and the feed speed of the work W by the feed rolls 151 obtained in advance in such a manner that the gap is set to the consolidation gap at a timing when the front edge F of the work W has passed through the narrowest position of the gap by the first predetermined distance, i.e., the gap is maintained larger than the consolidation gap (and larger than the thickness of the work W) until the front edge F of the work W has passed through the narrowest position of the gap by the first predetermined distance.

In addition, as described above for the roll press machine 50 of the second embodiment, the present inventors have also found that, at a press-forming for the material in which the plurality of electrode layers having been applied on the metal foil, when the material is moved out of the gap between the lower roll and the upper roll for consolidating, a concentrated load may be generated at the work W. In that case, chipping or crackling may be caused at the material. Furthermore, the present inventors have found that, it is remarkably effective to maintain the gap to the consolidation gap until the rear edge R of the work W has arrived at a position of a second predetermined distance toward the narrowest position of the gap, and to set the gap larger than the consolidation gap (and larger than the thickness of the work W) at a timing when the rear edge R of the work W has arrived at the position of the second predetermined distance toward the narrowest position of the gap, in order to prevent the chipping or crackling at the material (at the edge of the material). Preferably, the second predetermined distance is also selected within a range of 0.001 mm to 3.000 mm, more preferably within a range of 1 mm to 3 mm, although it may depend on the type and/or the thickness of the material.

In the present variation, when the rear edge R of the work W (see FIG. 8) passes through the detection positon of the position sensor 152 as well, the output of the position sensor 152 is changed depending on a change of the thickness of the work W. Through the detection of the change, it is possible to detect when the rear edge R of the work W arrives at the detection position of the position sensor 152.

Based on these findings, the controlling device 35 of the present variation controls the electric motors 13 of the electric lifting apparatuses 10 based on the detection results by the position sensor 152 and the feed speed of the work W by the feed rolls 151 obtained in advance in such a manner that the gap is maintained to the consolidation gap until the rear edge R of the work W has arrived at the position of the second predetermined distance toward the narrowest position of the gap, and that the gap is set larger than the consolidation gap at a timing when the rear edge R of the work W has arrived at the position of the second predetermined distance toward the narrowest position of the gap.

In addition, in the present variation as well, since the lower roll 23 and the upper roll 24 are driven by servomotors, it is possible to synchronize them to the feed rolls 151 with high precision. Thereby, it is possible to achieve a feed control of the work W with high precision.

In particular, according to the present variation, since the feed rolls 151 are disposed on the downstream side of the lower roll 23 and the upper roll 24, the work having been consolidated and hardened comes into contact with the feed rolls 51 to be fed by the same. Thus, it is possible to give a sufficient nip pressure to the work W. Therefore, it is remarkably prevented that a slip is generated between the feed rolls 51 and the work W, so that it is possible to achieve a feed control of the work W with higher precision.

Furthermore, in the case of the roll press machine 50 shown in FIG. 7, there is concern that the work W having relatively low hardness before the consolidation may be undesirably damaged by the feed rolls 51. However, according to the present variation, it is possible to remove such concern.

Moreover, in the present variation as well, when a thermal process is added to the lower roll 23 and the upper roll 24, the lower roll 23 and the upper roll 24 may be thermally deformed (in particular, diameters thereof may be changed). However, for example by using a temperature detection by a temperature sensor, an appropriate compensation control can be carried out.

[Operation of Roll Press Machine 150]

According to the roll press machine 150 of the present variation as well as the roll press machine 50 of the second embodiment, it is detected by the position sensor 152 that the front edge F of the work W has arrived at the detection position of the position sensor 152. Then, based on the predetermined basic distance C, the first predetermined distance and the feed speed of the work W, the controlling device 35 controls the electric motors 13 of the electric lifting apparatuses 10 in such a manner that the gap is adjusted to the consolidation gap with high precision at a timing when the front edge F of the work W has passed through the narrowest position of the gap by the first predetermined distance. In other words, until the front edge F of the work W has passed through the narrowest position of the gap by the first predetermined distance, the gap is maintained larger than the consolidation gap (and larger than the thickness of the work W).

Thus, it is possible to effectively prevent generation of the concentrated load when the work W is supplied into the gap, and thus it is possible to effectively prevent generation of the chipping or crackling at the front edge of the work W.

In addition, according to the roll press machine 150 of the present variation as well as the roll press machine 50 of the second embodiment, it is detected by the position sensor 152 that the rear edge R of the work W has arrived at the detection position of the position sensor 152. Then, based on the predetermined basic distance C, the second predetermined distance and the feed speed of the work W, the controlling device 35 controls the electric motors 13 of the electric lifting apparatuses 10 in such a manner the gap is maintained to the consolidation gap until the rear edge R of the work W has arrived at the position of the second predetermined distance toward the narrowest position of the gap, and that the gap is set larger than the consolidation gap at a timing when the rear edge R of the work W has arrived at the position of the second predetermined distance toward the narrowest position of the gap.

Thus, it is possible to effectively prevent generation of the concentrated load when the work W is moved out of the gap, and thus it is possible to effectively prevent generation of the chipping or crackling at the rear edge of the work W.

In the roll press machine 150 of the present variation as well, it is effective to set the consolidation gap to a constant value within a range of 70% to 90% of the thickness of the work W before the consolidation. Alternatively, it is also effective to set the feed speed of the work W to a value within a range of 1 mm/sec to 100 mm/sec and to carry out a cycling operation by fluctuating the consolidation gap within a range of 70% to 110% of the thickness of the work W before the consolidation with a frequency of 1 Hz to 10 Hz (1 to 10 times a second). In the latter case, it is possible to reduce power consumption with respect to a compression rate, at which the material is compressed by the press-forming (consolidating), by about 10%, as described above.

[Load Control of Roll Press Machine 50, 150]

As described above, in the roll press machine 50 or 150 as well as in the roll press machine 20, the lower roll supporting bodies 22 are placed on the second moving bodies 18 of the electric lifting apparatuses 10 via the load cells 21. By using a change of load values detected by the load cells 21, it is possible to control the electric motors 13 of the electric lifting apparatuses 10.

The method of controlling the electric motors 13 of the electric lifting apparatuses 10 described above with reference to FIGS. 7 and 8 uses the detection of the front edge position and the rear edge position of the work W by the position sensor 52 or 152. Herein, in principle, when there is distortion and/or application unevenness at the front edge portion and the rear edge portion of the work W, a position detection error by the position sensor 52 or 152 may be increased, and thus there may be possibility that the electric motors 13 of the electric lifting apparatuses 10 are not properly controlled.

In contrast, the change of load values detected by the load cells 21 is generated by the work W actually coming into contact with the lower roll 23 and/or the upper roll 24. Thus, according to a method of using this to control the electric motors 13 of the electric lifting apparatuses 10, even when there is distortion and/or application unevenness at the front edge portion and the rear edge portion of the work W, adverse effects that might be caused thereby are small.

More specifically, the present inventors have found that, at a press-forming for the material in which the plurality of electrode layers having been applied on the metal foil, when the material is supplied as a work W into the gap between the lower roll and the upper roll for consolidating, a concentrated load may be generated at a front edge of the work W. In that case, chipping or crackling may be caused at the material (at the front edge of the material). Furthermore, the present inventors have found that, it is remarkably effective to start reducing the gap to the consolidation gap only after the load cells 21 have detected a predetermined load increase per unit time, i.e., to maintain the gap larger than the consolidation gap (but smaller than the thickness of the work W (before the consolidation)) until the load cells 21 have detected a predetermined load increase per unit time, in order to prevent the chipping or crackling at the material (at the front edge of the material).

According to the results of the experiments carried out by the present inventors, when the material in which the plurality of electrode layers having been applied on the metal foil is used as a work W, it is effective to set the predetermined load increase per unit time to a value within a range of 100 N/msec to 1000 N/msec, preferably within a range of 100 N/msec to 200 N/msec.

Figure 9:
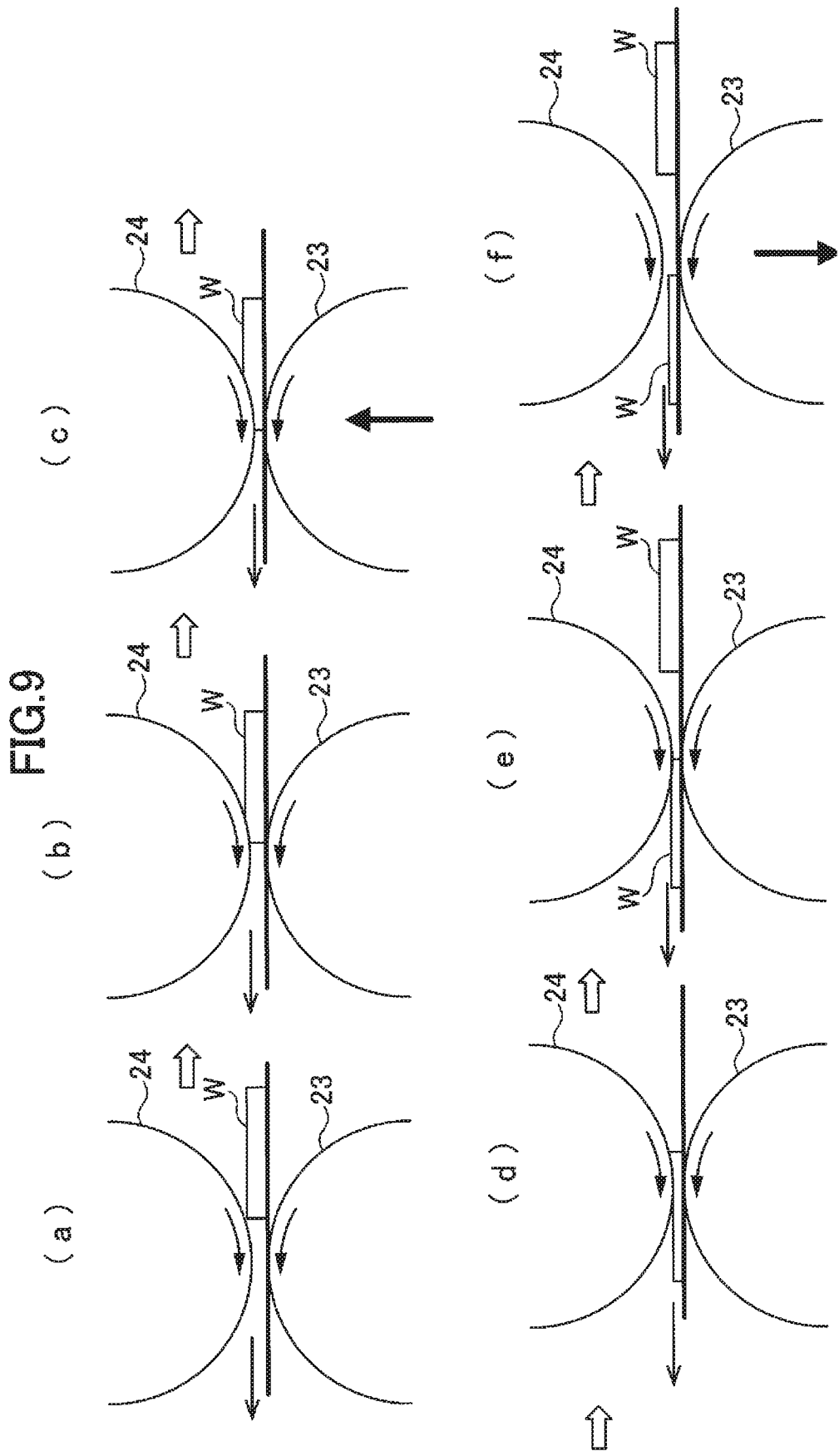
FIG. 9 is a schematic flow diagram showing a control example of a roll press machine based on a change of load values detected by load cells.

Based on these findings, as shown in FIG. 9, while the feed rolls 51 or 151 (an example of work supplying device) are driven, the controlling device 35 of the roll press machine 50 or 150 controls the electric motors 13 of the electric lifting apparatuses 10 in such a manner that the gap starts being reduced to the consolidation gap at a timing when the load cells 21 have detected the predetermined load increase per unit time (see FIG. 9 (*b*)) (while the feed rolls 51 or 151 continue to be driven) (a state wherein the gap has finished being reduced is shown in FIG. 9 (*c*)), i.e., the gap is maintained larger than the consolidation gap (but smaller than the thickness of the work W (before the consolidation)) (see FIG. 9 (*a*)) until the load cells 21 have detected the predetermined load increase per unit time.

In addition, the present inventors have also found that, at a press-forming for the material in which the plurality of electrode layers having been applied on the metal foil, when the material is moved out of the gap between the lower roll and the upper roll for consolidating, a concentrated load may be generated at the work W. In that case, chipping or crackling may be caused at the material. Furthermore, the present inventors have found that, it is remarkably effective to maintain the gap to the consolidation gap until the load cells 21 have detected a predetermined load decrease per unit time, and to start returning the gap to the original state larger than the consolidation gap (but smaller than the thickness of the work W (before the consolidation)) at a timing when the load cells 21 have detected a predetermined load decrease per unit time, in order to prevent the chipping or crackling at the material (at the edge of the material).

According to the results of the experiments carried out by the present inventors, when the material in which the plurality of electrode layers having been applied on the metal foil is used as a work W, it is effective to set the predetermined load decrease per unit time to a value within a range of 100 N/msec to 1000 N/msec, preferably within a range of 100 N/msec to 200 N/msec.

Based on these findings, as shown in FIG. 9, while the feed rolls 51 or 151 (an example of work supplying device) are driven, the controlling device 35 of the roll press machine 50 or 150 controls the electric motors 13 of the electric lifting apparatuses 10 in such a manner that the gap is maintained to the consolidation gap until the load cells 21 have detected the predetermined load decrease per unit time (see FIG. 9 (*d*)), and that the gap starts being returned to the original state larger than the consolidation gap (but smaller than the thickness of the work W (before the consolidation)) at a timing when the load cells 21 have detected the predetermined load decrease per unit time (see FIG. 9(*e*)) (while the feed rolls 51 or 151 continue to be driven) (a state wherein the gap has finished being returned is shown in FIG. 9 (*e*)).

[Effect of Load Control of Roll Press Machine 50 or 150]

According to the roll press machine 50 or 150, when a front edge of a work W arrives at the gap between the lower roll 23 and the upper roll 24 while the feed rolls 51 or 151 are driven, load values detected by the load cells 21 are increased. Then, at a timing when the load cells 21 have detected the predetermined load increase per unit time, the controlling device 35 of the roll press machine 50 or 150 controls the electric motors 13 of the electric lifting apparatuses 10 in such a manner that the gap starts being reduced to the consolidation gap. The gap is maintained larger than the consolidation gap (but smaller than the thickness of the work W (before the consolidation)) until the load cells have detected the predetermined load increase per unit time.

By carrying out this control wherein the gap starts being reduced to the consolidation gap at a timing when (only after) the load cells 21 have detected the predetermined load increase per unit time when the work W is supplied into the gap, it is possible to cause a so-called biting of the work W to precede the control. Thereby, it is possible to effectively prevent generation of the concentrated load when the work W is supplied into the gap, and thus it is possible to effectively prevent generation of the chipping or crackling at the front edge portion of the work W.

In addition, according to the roll press machine 50 or 150, when the rear edge of the work W approaches the narrowest position between the lower roll 23 and the upper roll 24 (but has not still passed through the narrowest position) while the feed rolls 51 or 151 are driven, the load values detected by the load cells 21 are decreased. Then, at a timing when the load cells 21 have detected the predetermined load decrease per unit time, the controlling device 35 of the roll press machine 50 or 150 controls the electric motors 13 of the electric lifting apparatuses 10 in such a manner that the gap starts being returned to the original state larger than the consolidation gap (but smaller than the thickness of the work W (before the consolidation)). The gap is maintained to the consolidation gap until the load cells 21 have detected the predetermined load decrease per unit time.

By carrying out this control wherein the gap starts being returned to the original state larger than the consolidation gap at a timing when the load cells 21 have detected the predetermined load decrease per unit time when the rear edge of the work W approaches the narrowest position of the gap (but has not still passed through the narrowest position), it is possible to cause this control to precede a so-called moving-out of the work W. Thereby, it is possible to effectively prevent generation of the concentrated load when the work W is moved out of the gap, and thus it is possible to effectively prevent generation of the chipping or crackling at the rear edge portion of the work W.

When the above load control is used as well, it is effective to set the consolidation gap to a constant value within a range of 70% to 90% of the thickness of the work W before the consolidation. Alternatively, it is also effective to set the feed speed of the work W to a value within a range of 1 mm/sec to 100 mm/sec and to carry out a cycling operation by fluctuating the consolidation gap within a range of 70% to 110% of the thickness of the work W before the consolidation with a frequency of 1 Hz to 10 Hz (1 to 10 times a second). In the latter case, it is possible to reduce power consumption with respect to a compression rate, at which the material is compressed by the press-forming (consolidating), by about 10%, as described above.

As a load sensor which detects loads of the lower roll 23 and/or the upper roll 24, any other load sensor may be arranged and used at a suitable place, not limited to the load cells 21.

[Structure of Roll Press Machine 60]

Next, FIG. 8 is a schematic view of a roll press machine 60 according to a third embodiment of the present invention.

Figure 11:
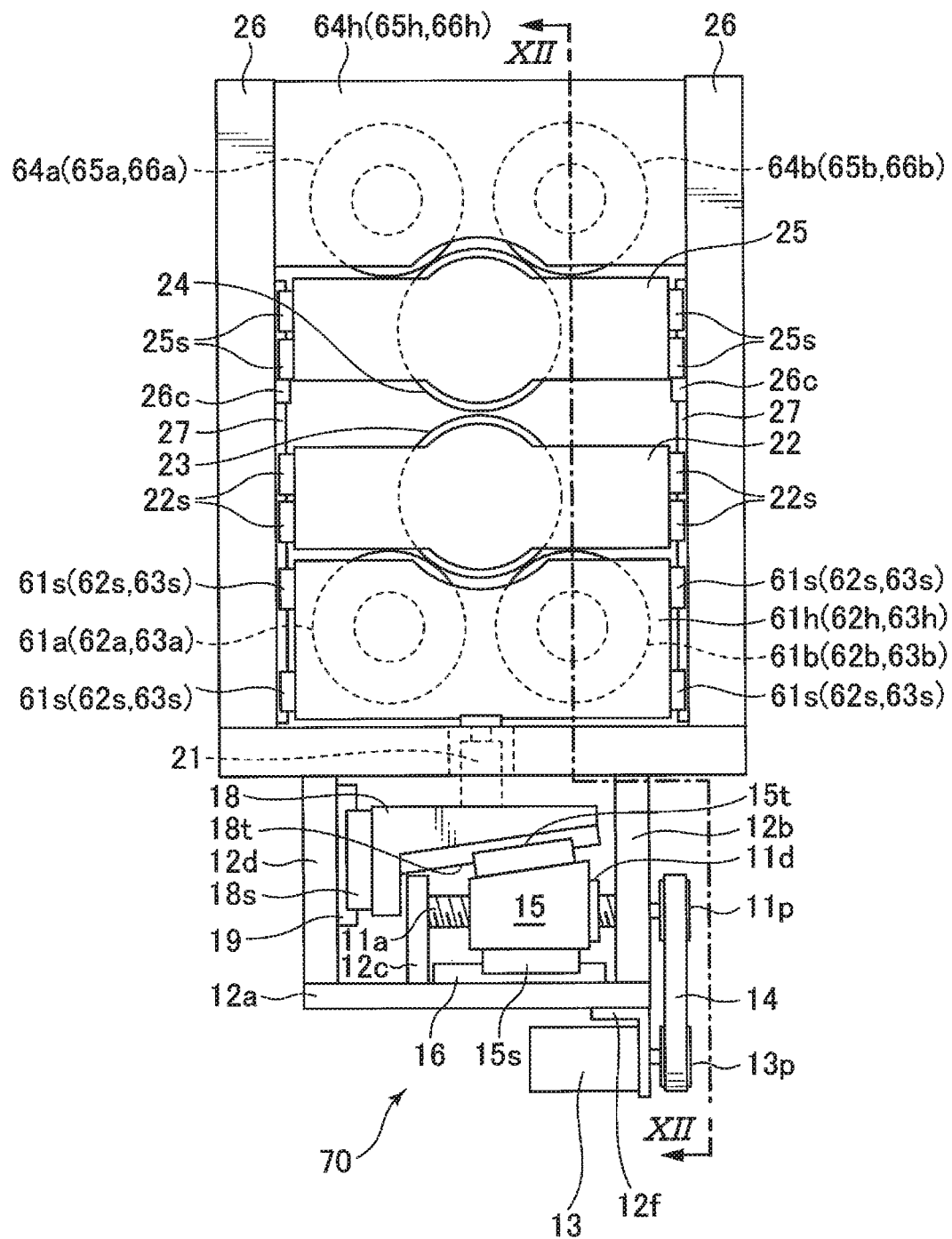
FIG. 11 is a schematic side view showing the roll press machine according to the third embodiment of the present invention.
Figure 12:
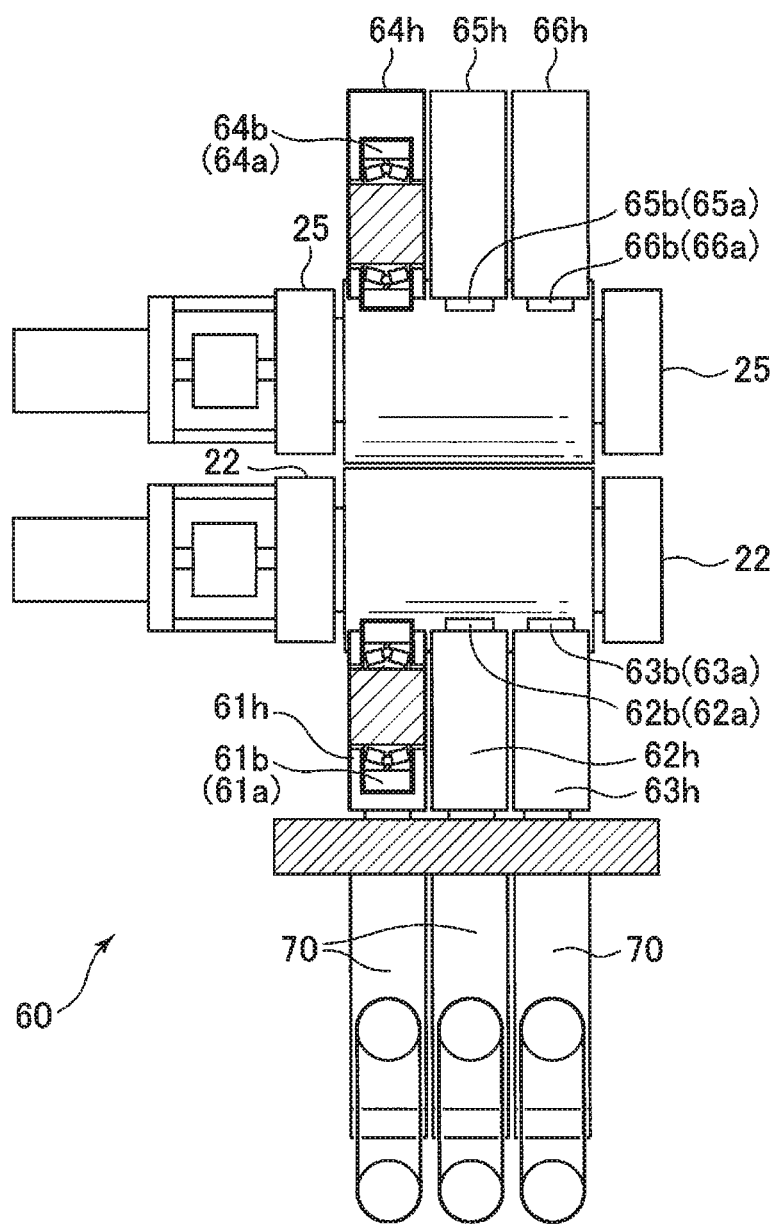
FIG. 12 is a section view taken along line XII-XII of FIG. 11.

FIG. 11 is a schematic side view of the roll press machine 60 of the present embodiment. FIG. 12 is a section view taken along line XII-XII of FIG. 11. In the roll press machine 60 of the present embodiment, sizes of some components (the lower roll supporting bodies 22, the upper roll supporting bodies 25, the roll frame 26, and the like: see FIGS. 2 and 9) of the roll press machine 50 of the second embodiment are changed, a supporting manner of the upper roll supporting bodies 25 is changed, and backup rolls described below and the like are added.

Figure 10:
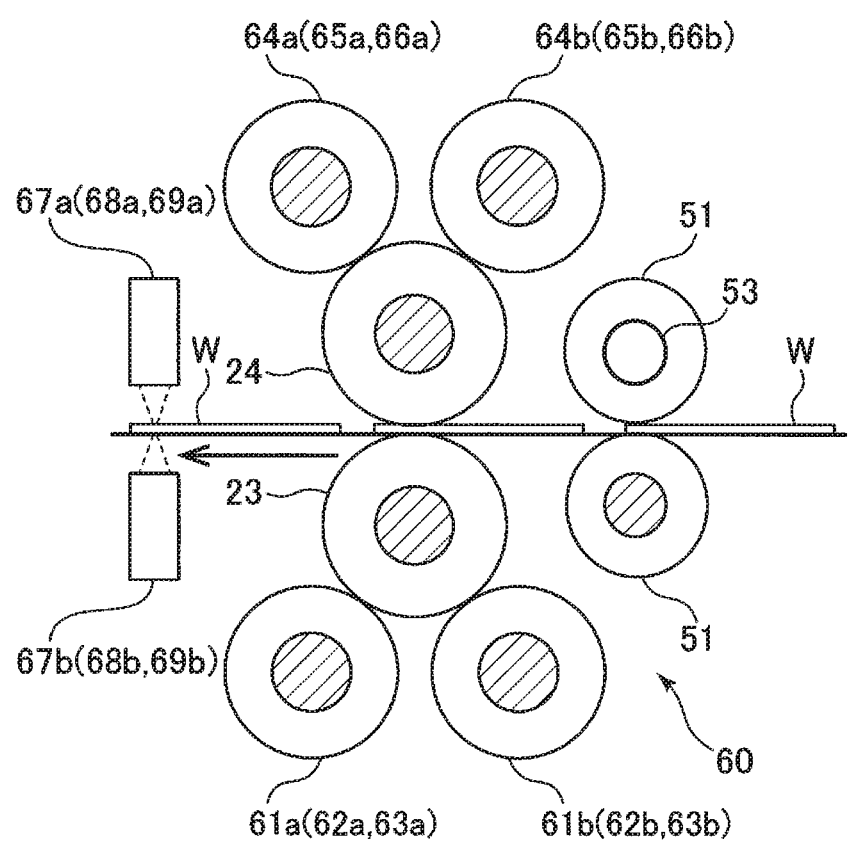
FIG. 10 is a schematic view showing a roll press machine according to a third embodiment of the present invention.

In FIGS. 10 to 12, except for the lower roll supporting bodies 22, the lower roll 23, the upper roll 24, the upper roll supporting bodies 25, the roll frame 26, the third sliding guides 27, the feed rolls 51 and the encoder 53, the components of the roll press machine 50 of the second embodiment are not shown.

As shown in FIGS. 10 to 12, main components added in the present embodiment are three pairs of upper backup rolls and three pairs of lower backup rolls, i.e., six pairs of backup rolls in total.

The present inventors have found that, for a control of maintaining uniform thickness precision of a press-formed work with high precision, it is effective to provide upper-roll backup rolls on an upper surface side of the upper roll 24 to counterbalance an upward deforming (deflecting) force of the upper roll 24 (involving the upper roll supporting bodies 25 and the roll frame 26 which support the upper roll 24) produced by a reaction force from a work W at a press-forming, and to provide lower-roll backup rolls on an lower surface side of the lower roll 23 to counterbalance an downward deforming (deflecting) force of the lower roll 23 (involving the lower roll supporting bodies 22 which support the lower roll 23) produced by a reaction force from the work W at the press-forming.

In addition, the present inventors have found that, as seen in a direction of an axis of the upper roll 24, the upward deforming (deflecting) force of the upper roll 24 and displacement of the upper roll 24 that may be caused by this force may be different between in a one side area, in a middle area and in the other side area. Similarly, the present inventors have found that, as seen in a direction of an axis of the lower roll 23, the downward deforming (deflecting) force of the lower roll 23 and displacement of the lower roll 23 that may be caused by this force may be different between in a one side area, in a middle area and in the other side area. Based on these, the present inventors have further found that, it is effective to provide a pair of an upper-roll backup roll and a lower-roll backup roll for each of the one side area, the middle area and the other side area as seen in the directions of the axes of the upper roll 24 and the lower roll 23, and to independently control a gap between the upper-roll backup roll and the lower-roll backup roll for each pair.

Furthermore, the present inventors have found that, it is effective to provide a pair of upper-roll backup rolls on both sides with respect to the axis of the upper roll 24 in a plan view, on the upper surface side of the upper roll 24, in order to counterbalance the upward deforming force of the upper roll 24 in a well-balanced manner. Similarly, the present inventors have found that, it is effective to provide a pair of lower-roll backup rolls on both sides with respect to the axis of the lower roll 23 in a plan view, on the lower surface side of the lower roll 23, in order to counterbalance the downward deforming force of the lower roll 23 in a well-balanced manner.

Based on these findings, in the roll press machine 60 of the present embodiment, a pair of upper-roll backup rolls is provided for each of the one side area, the middle area and the other side area as seen in the direction of the axis of the upper roll 24, and a pair of lower-roll backup rolls is provided for each of the one side area, the middle area and the other side area as seen in the direction of the axis of the lower roll 23.

Specifically, in the roll press machine 60 of the present embodiment: a pair of lower-roll one side backup rolls 61a, 61b, each of which and the lower roll 23 roll on each other, is arranged on the lower surface side of the lower roll 23 in the one side area as seen in the direction of the axis of the lower roll 23 (the left side area of FIG. 12); a pair of lower-roll middle backup rolls 62a, 62b, each of which and the lower roll 23 also roll on each other, is arranged on the lower surface side of the lower roll 23 in the middle area as seen in the direction of the axis of the lower roll 23 (the middle area of FIG. 12); and a pair of lower-roll other side backup rolls 63a, 63b, each of which and the lower roll 23 also roll on each other, is arranged on the lower surface side of the lower roll 23 in the other side area as seen in the direction of the axis of the lower roll 23 (the right side area of FIG. 12).

In addition, in the roll press machine 60 of the present embodiment: a pair of upper-roll one side backup rolls 64a, 64b, each of which and the upper roll 24 roll on each other, is arranged on the upper surface side of the upper roll 24 in the one side area as seen in the direction of the axis of the upper roll 24 (the left side area of FIG. 12); a pair of upper-roll middle backup rolls 65a, 65b, each of which and the upper roll 24 also roll on each other, is arranged on the upper surface side of the upper roll 24 in the middle area as seen in the direction of the axis of the upper roll 24 (the middle area of FIG. 12); and a pair of upper-roll other side backup rolls 66a, 66b, each of which and the upper roll 24 also roll on each other, is arranged on the upper surface side of the upper roll 24 in the other side area as seen in the direction of the axis of the upper roll 24 (the right side area of FIG. 12).

The pair of lower-roll one side backup rolls 61a, 61b is supported in common by a lower-roll one side backup roll supporting housing 61h in such a manner that each of the pair of lower-roll one side backup rolls 61a, 61b is rotatable. The pair of lower-roll middle backup rolls 62a, 62b is supported in common by a lower-roll middle backup roll supporting housing 62h in such a manner that each of the pair of lower-roll middle backup rolls 62a, 62b is rotatable. The pair of lower-roll other side backup rolls 63a, 63b is supported in common by a lower-roll other side backup roll supporting housing 63h in such a manner that each of the pair of lower-roll other side backup rolls 63a, 63b is rotatable.

The pair of upper-roll one side backup rolls 64a, 64b is supported in common by a upper-roll one side backup roll supporting housing 64h in such a manner that each of the pair of upper-roll one side backup rolls 64a, 64b is rotatable. The pair of upper-roll middle backup rolls 65a, 65b is supported in common by a upper-roll middle backup roll supporting housing 65h in such a manner that each of the pair of upper-roll middle backup rolls 65a, 65b is rotatable. The pair of upper-roll other side backup rolls 66a, 66b is supported in common by a upper-roll other side backup roll supporting housing 66h in such a manner that each of the pair of upper-roll other side backup rolls 66a, 66b is rotatable.

In addition, in the roll press machine 60 of the present embodiment, an electric lifting apparatus 70 is provided as a one side backup rolls adjusting apparatus for causing the lower-roll one side backup roll supporting housing 61h and the upper-roll one side backup roll supporting housing 64h to move relative to each other, to control a gap between the lower-roll one side backup rolls 61a, 61b and the upper-roll one side backup rolls 64a, 64b.

Similarly, in the roll press machine 60 of the present embodiment, the same electric lifting apparatus 70 is provided as a middle backup rolls adjusting apparatus for causing the lower-roll middle backup roll supporting housing 62h and the upper-roll middle backup roll supporting housing 65h to move relative to each other, to control a gap between the lower-roll middle backup rolls 62a, 62b and the upper-roll middle backup rolls 65a, 65b.

Furthermore, in the roll press machine 60 of the present embodiment, the same electric lifting apparatus 70 is provided as another side backup rolls adjusting apparatus for causing the lower-roll other side backup roll supporting housing 63h and the upper-roll other side backup roll supporting housing 66h to move relative to each other, to control a gap between the lower-roll other side backup rolls 63a, 63b and the upper-roll other side backup rolls 66a, 66b.

In the present embodiment, as shown in FIG. 11, the upper-roll one side backup roll supporting housing 64h, the upper-roll middle backup roll supporting housing 65h and the upper-roll other side backup roll supporting housing 66h are fixed to the roll frame 26. On the other hand, the upper roll supporting bodies 25 are supported by the roll frame 26 in such a manner that the upper roll supporting bodies 25 are movable up and down by about 1 mm above an anti-drop block 26c. Specifically, each of the pair of upper roll supporting bodies 25 is provided with pairs of opposite fourth sliding parts 25s which are slidably movable relative to the opposite third sliding guides 27.

With respect to the upper-roll one side backup roll supporting housing 64h, the upper-roll middle backup roll supporting housing 65h and the upper-roll other side backup roll supporting housing 66h, the lower-roll one side backup roll supporting housing 61h, the lower-roll middle backup roll supporting housing 62h and the lower-roll other side backup roll supporting housing 63h are independently movable up and down by means of the respective corresponding electric lifting apparatuses 70.

In addition, as shown in FIG. 11, each of the lower-roll one side backup roll supporting housing 61h, the lower-roll middle backup roll supporting housing 62h and the lower-roll other side backup roll supporting housing 63h is provided with pairs of opposite fourth sliding parts 61s, 62s, 63s which are slidably movable relative to the opposite third sliding guides 27 provided on the roll frame 26.

On the other hand, in the roll press machine 60 of the present embodiment, as shown in FIG. 10, the dimension of the consolidated (press-formed) work W in the one side area is measured by a non-contact type distance measuring device 67a configured to measure a distance to an upper surface of the one side area of the work W and another non-contact type distance measuring device 67b configured to measure a distance to a lower surface of the one side area of the work W.

Similarly, the dimension of the consolidated (press-formed) work W in the middle area is measured by a non-contact type distance measuring device 68a configured to measure a distance to an upper surface of the middle area of the work W and another non-contact type distance measuring device 68b configured to measure a distance to a lower surface of the middle area of the work W.

Furthermore, the dimension of the consolidated (press-formed) work W in the other side area is measured by a non-contact type distance measuring device 69a configured to measure a distance to an upper surface of the other side area of the work W and another non-contact type distance measuring device 69b configured to measure a distance to a lower surface of the other side area of the work W.

Then, based on the above respective measurement results, the electric lifting apparatus 70 as the one side backup rolls adjusting apparatus, the electric lifting apparatus 70 as the middle backup rolls adjusting apparatus and the electric lifting apparatus 70 as the other side backup rolls adjusting apparatus are respectively independently controlled by the controlling device 35.

Each of the electric lifting apparatuses 70 of the present embodiment has a similar configuration to that of the electric lifting apparatus 10 configured to cause the lower roll supporting body 22 to move up and down.

The different points between them are that the electric lifting apparatus 70 does not have the quadrangular prism 12e and the frame ceiling plate 12g, and that the upper surfaces of the inside frame wall 12b and the outside frame wall 12d of the electric lifting apparatus 70 are fixed to the lower surface of the roll frame 26.

The other structure of the electric lifting apparatus 70 is substantially the same as the electric lifting apparatus 10. In the electric lifting apparatus 70, the same components as those of the electric lifting apparatus 10 are shown by the same reference numerals, and detailed explanation thereof is omitted.

Herein, the sizes (dimensions) of the various components of the electric lifting apparatus 70 may be different from those of the corresponding components of the electric lifting apparatus 10. Assume that a lifting force (pressing force) of the electric lifting apparatus 70 is 200 kN as a nominal value (600 kN for the three left, middle and right ones), a diameter of each roll is 450 mm and a width of each roll is 500 mm. Under this assumption, as an example, a size of the frame bottom plate 12a is 15 cm×90 cm in a plan view, and a thickness thereof is about 10 cm, a wall thickness of each of the inside frame wall 12b and the outside frame wall 12d is about 6 cm, and a height thereof is about 30 cm, a wall thickness of the central frame wall 12c is about 6 cm, and a height thereof is about 15 cm. Furthermore, as an example, the motor side pulley 13p and the threaded-shaft side pulley 11p have a diameter of about 8 cm to 12 cm in common, the motor side pulley 13p and the threaded-shaft side pulley 11p have a width (thickness) of about 4 cm in common, a width of the belt 14 is slightly narrower than this width and is about 3.5 cm for example, a length of the belt 14 depends on a distance between the axis x of the threaded shaft 11a and the output shaft 13s of the electric motor 13 and is about 70 to 80 cm for example. In some cases, a reduction gear may be formed by increasing the number of teeth of the threaded-shaft side pulley 11p with respect to the number of teeth of the motor side pulley 13p.

According to the above dimensional example, the whole size of the roll press machine 60 is within 180 cm in height×150 cm in width (×90 cm in depth).

[Operation of Roll Press Machine 60]

According to the roll press machine 60 of the present embodiment, each electric lifting apparatus 70 configured to function as a backup rolls adjusting apparatus is compact enough to achieve the configuration (layout) wherein independent backup rolls adjusting apparatuses (electric lifting apparatuses 70) are arranged at the three locations, i.e., in the one side area, in the middle area and in the other side area.

Then, by controlling the respective electric lifting apparatuses 70 independently, it is possible to finely counterbalance (compensate for) the deforming forces of the upper roll 24 and the lower roll 23 that may be different between in the one side area (the left side area of FIG. 12), in the middle area (the middle area of FIG. 12) and in the other side area (the right side area of FIG. 12), as seen in the directions of the axes of the upper roll 24 and the lower roll 23.

Specifically, in the roll press machine 60 of the present embodiment, the dimension of the consolidated work W in the one side area, the dimension of the consolidated work W in the middle area and the dimension of the consolidated work W in the other side area are actually measured by means of the three sets of the non-contact type distance measuring devices 67a, 67b, 68a, 68b, 69a, 69b. Then, based on these measurement results, the electric lifting apparatus 70 as the one side backup rolls adjusting apparatus, the electric lifting apparatus 70 as the middle backup rolls adjusting apparatus and the electric lifting apparatus 70 as the other side backup rolls adjusting apparatus are respectively independently controlled by the controlling device 35 in such a manner that the above dimensions are within an acceptable error range.

In addition, in the roll press machine 60 of the present embodiment, in each backup rolls adjusting apparatus (each electric lifting apparatus 70), the rotational force of the output shaft 13s of the electric motor 13 is used as the rotational force of the threaded shaft 11a of the ball screw 11, and the second moving body 18 moves linearly in the direction perpendicular to the direction of the axis x when the first moving body 15 fixed to the nut 11d of the ball screw 11 moves linearly in the direction of the axis x. Thereby, the movement of the second moving body 18 can be controlled with high precision by the electric motor 13. That is to say, each backup rolls adjusting apparatus (each electric lifting apparatus 70) can be controlled with high precision.

[Variation of Roll Press Machine 60]

At least at the time of filing the present application, the present invention includes a manner in which the lower-roll middle backup rolls 62a, 62b, the upper-roll middle backup rolls 65a, 65b, the lower-roll middle backup roll supporting housing 62h, the upper-roll middle backup roll supporting housing 65h and the middle backup rolls adjusting apparatus (the middle electric lifting apparatus 70) are not adopted. This manner falls within the scope of claims.

To the contrary, if the upper roll 24 and the lower roll 23 are longer in the directions in the axes thereof, the present invention includes a manner adopting two or more sets, each set consisting of: the lower-roll middle backup rolls 62a, 62b; the upper-roll middle backup rolls 65a, 65b; the lower-roll middle backup roll supporting housing 62; the upper-roll middle backup roll supporting housing 65h; and the middle backup rolls adjusting apparatus (one electric lifting apparatus 70). This manner also falls within the scope of claims.

[First Variation of Electric Lifting Apparatus]

In the above embodiments, the rotational force of the output shaft 13s of the electric motor 13 is transferred to the threaded shaft 11a via the motor side pulley 13p, the threaded-shaft side pulley 11p and the belt 14.

Figure 13:
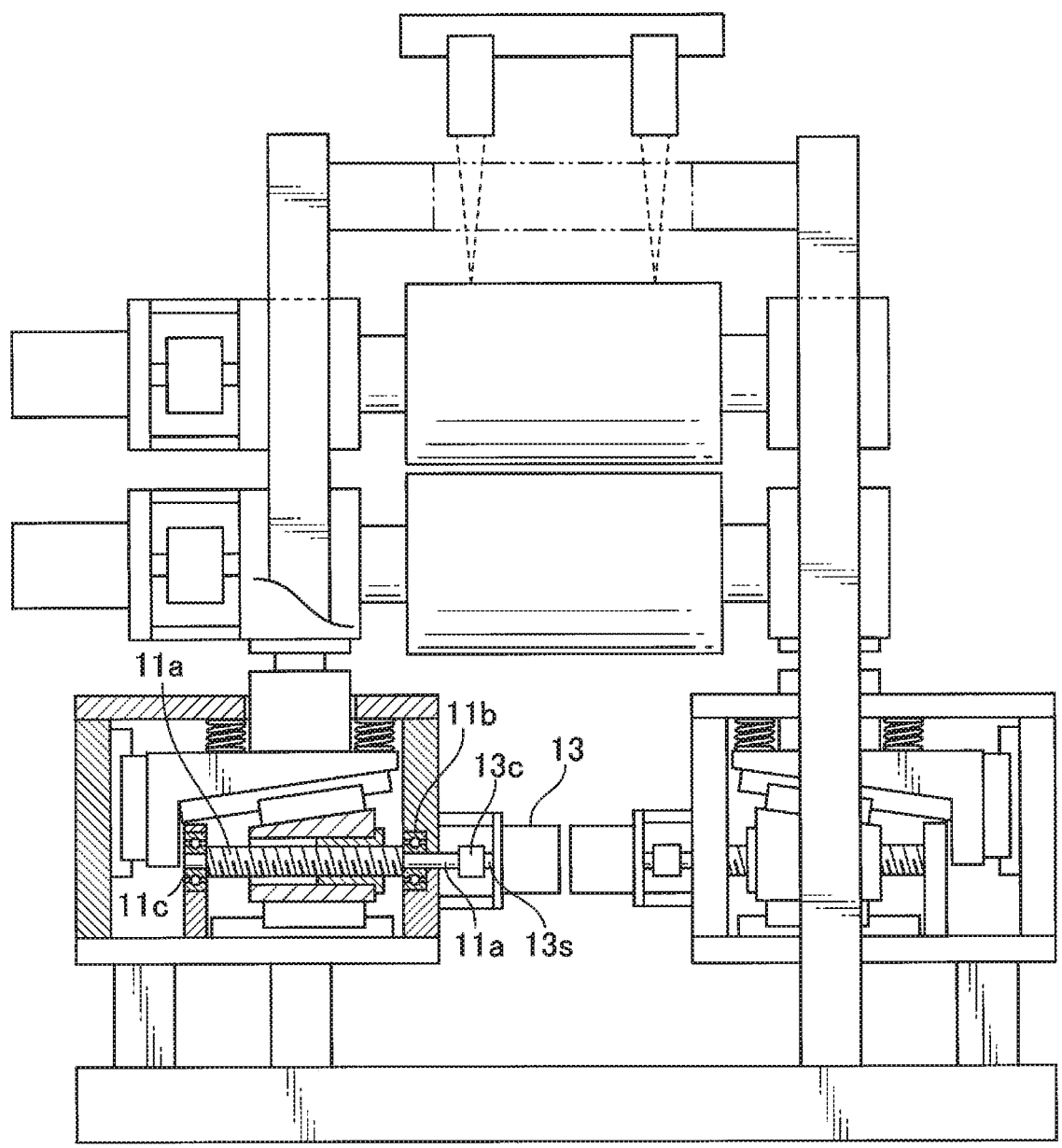
FIG. 13 is a schematic front view showing a roll press machine including a first variation of the electric lifting apparatus.

However if it is allowed that the size of the electric lifting apparatus is large to some extent, such as when the width of the rolls is large, the output shaft 13s of the electric motor 13 and the threaded shaft 11a may be arranged on a straight line. Such a variation is shown in FIG. 13. In this variation, the output shaft 13s of the electric motor 13 and the threaded shaft 11a are coupled to each other via a coupling 13c.

In the present first variation, the size of the electric lifting apparatus is larger than those of the above described electric lifting apparatuses 10, 70, but maintenance performance thereof is better.

At least at the time of filing the present application, even in the case wherein the motor side pulley 13p, the threaded-shaft side pulley 11p and the belt 14 are used, it is not intended to limit to the manner wherein the output shaft 13s of the electric motor 13 and the threaded shaft 11a are arranged in the vertical direction, i.e., it is not excluded that the output shaft 13s of the electric motor 13 and the threaded shaft 11a are arranged in a horizontal direction (right and left direction).

In addition, the outside bearing 11c configured to support the threaded shaft 11a of the ball screw 11 may be buried in the outside frame wall 12d, instead of in the central frame wall 12c. In this case, the central frame wall 12c may be omitted, which may make the electric lifting apparatus more compact.

[Structure of Second Variation of Electric Lifting Apparatus]

Figure 14:
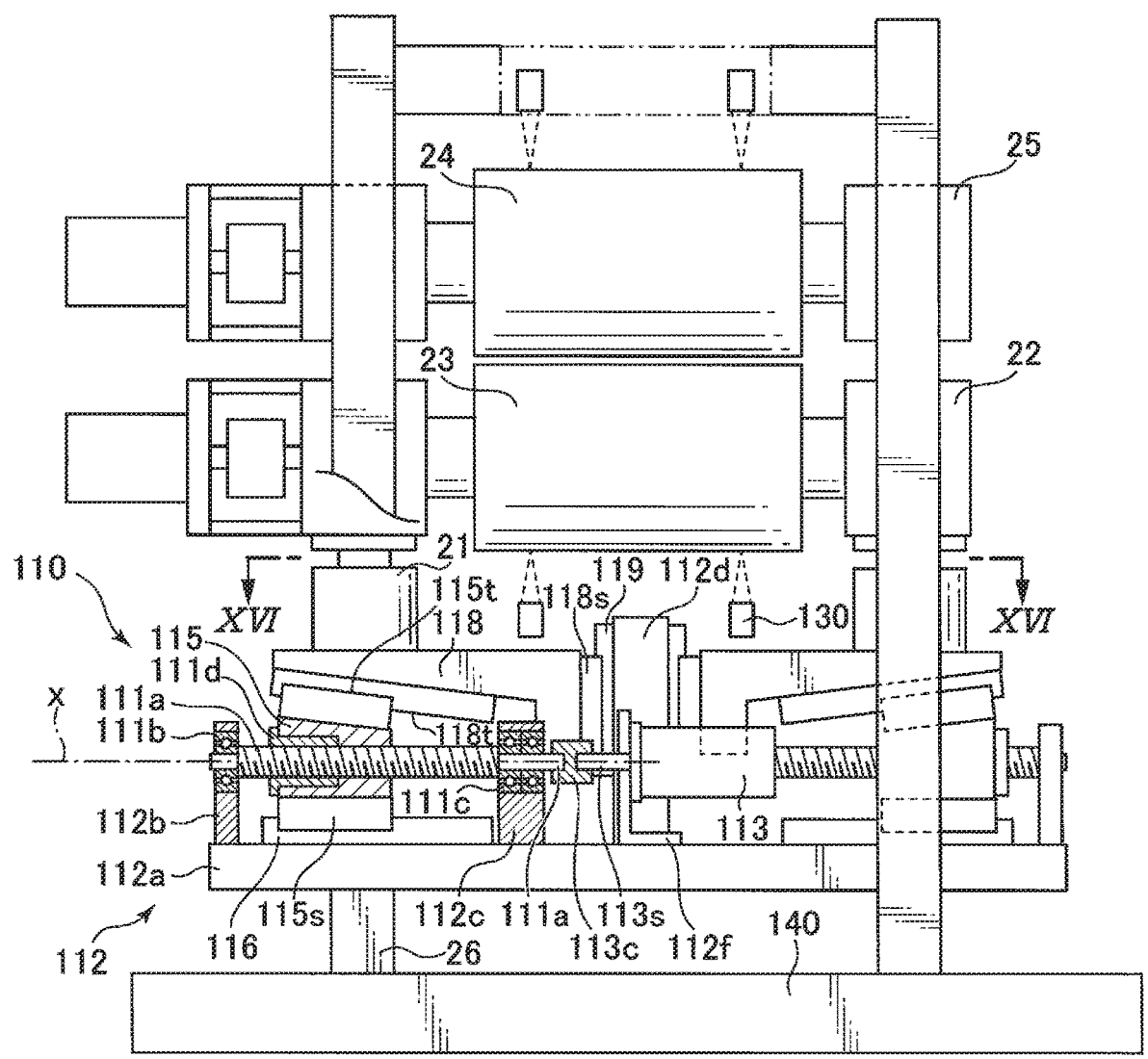
FIG. 14 is a schematic front view showing a roll press machine including a second variation of the electric lifting apparatus.
Figure 15:
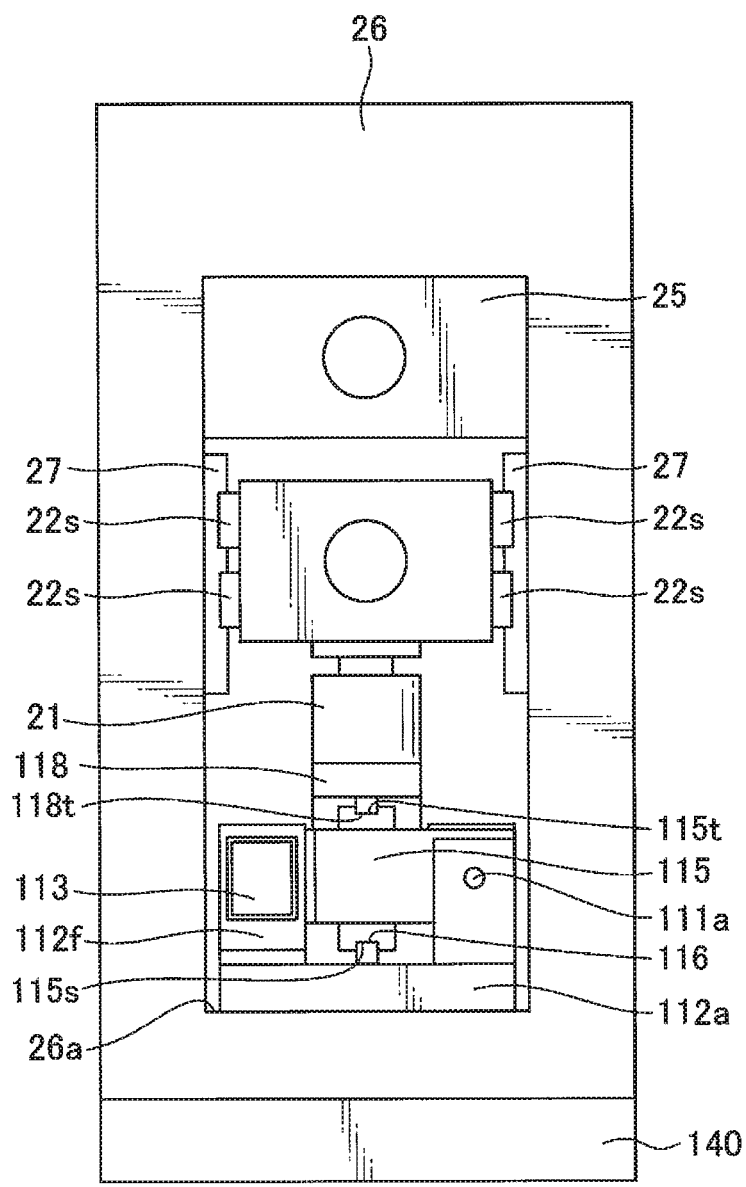
FIG. 15 is a schematic side view of the roll press machine shown in FIG. 14.
Figure 16:
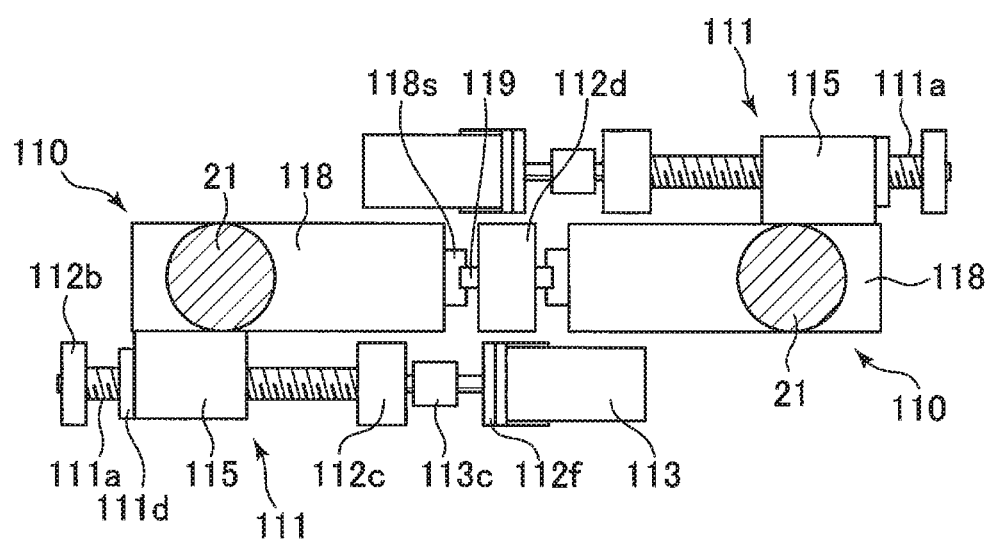
FIG. 16 is a section view taken along line XVI-XVI of the roll press machine shown in FIG. 14.

FIG. 14 is a schematic front view showing a roll press machine including a second variation of the electric lifting apparatus, FIG. 15 is a schematic side view of the roll press machine shown in FIG. 14, and FIG. 16 is a section view taken along line XVI-XVI of the roll press machine shown in FIG. 14.

As shown in FIG. 14, the electric lifting apparatus 110 of the second variation includes a ball screw 111. The ball screw 111 has: a threaded shaft 111a having an axis x; a pair of bearings 111b, 111c provided at both end parts of the threaded shaft 111a and configured to support the threaded shaft 111a in such a manner that the threaded shaft 111a is rotatable around the axis x; and a nut 111d threadedly engaged with the threaded shaft 111a via a plurality of rolling elements (not shown) in such a manner that the nut 111d moves linearly in a direction of the axis x when the threaded shaft 111a rotates.

As well as the axis x of the threaded shaft 11a of the electric lifting apparatus 10, the axis x of the threaded shaft 111a is also parallel to the axis of the lower roll 23 (one side roll) and the axis of the upper roll 24 (the other side roll). The bearing 111c (two juxtaposed bearings) on the roll side (on the inner side) is buried in (supported by) an inside frame wall 112c. The bearing 111b on the opposite side (on the outer side) is buried in (supported by) an outside frame wall 112b. The inside frame wall 112c and the outer frame wall 112b are erected on an upper surface of a plate-like frame bottom plate 112a.

With reference to FIGS. 14 and 15 (and further with reference to FIG. 2), a lower surface of the frame bottom plate 112a is supported by a lower part 26a of a roll frame 26. In addition, an electric motor mounting plate 112f, which has a L-shaped section, is fixed to an upper surface of the frame bottom plate 112a inner than the inside frame wall 112c.

A frame 112 is formed by the frame bottom plate 112a, the outside frame wall 112b, the inside frame wall 112c, a central frame wall 112d described below and the electric motor mounting plate 112f. These components of the frame 112 may be integrally formed, or may be separately formed and subsequently fixed to each other.

As shown in FIG. 14, an electric motor 113 having an output shaft 113s being rotatable (preferably a servomotor) is fixed to the electric motor mounting plate 112f. The output shaft 113s of the electric motor 113 is aligned on a straight line along the axis x of the threaded shaft 111a of the ball screw 111. In the present variation, the output shaft 113s of the electric motor 113 and the threaded shaft 111a are coupled to each other via a coupling 113c.

A first moving body 115 is fixed to the nut 111d of the ball screw 111 and is movable integrally with the nut 111d. The first moving body 115 has a first sliding surface 115t inclined at a predetermined angle with respect to a plane (a horizontal plane in the present variation) including the direction of the axis x of the threaded shaft 111a.

In addition, as clearly seen from FIG. 14, the threaded shaft 111a extends through the first moving body 115 in the direction of the axis x. The pair of bearings 111b, 111c is arranged on both sides of the first moving body 115.

A first sliding guide 116, which extends in parallel with the direction of the axis x, is provided on the upper surface of the frame bottom plate 112a. The first moving body 115 is provided with a first sliding part 115s which is slidably movable relative to the first sliding guide 116. Slidable surfaces of the first sliding guide 116 and the first sliding part 115s extend in parallel with the direction of the axis x of the threaded shaft 111a in a plan view.

In the present variation, as shown in FIG. 15, the first sliding part 115s extends in parallel with the direction of the axis x of the threaded shaft 111a, but in a position offset therefrom in a plan view. In addition, as shown in FIG. 15, the first sliding surface 115t also extends in parallel with the direction of the axis x of the threaded shaft 111a, but in a position offset therefrom in a plan view. The first sliding surface 115t and the first sliding part 115s are arranged in such a manner they are almost overlapped with each other in a plan view.

In addition, the electric lifting apparatus 110 has a second moving body 118 arranged to be movable linearly in a direction (a vertical direction in the present variation) perpendicular to the direction of the axis x with respect to the frame 112. The second moving body 118 has a second sliding surface 118t, which is slidably movable relative to the first sliding surface 115t. Thereby, the second moving body 118 is caused to move linearly in the above perpendicular direction by a sliding movement between the first sliding surface 115t and the second sliding surface 118t when the nut 111d and the first moving body 115 moves linearly in the direction of the axis x.

In addition, in the present variation, as shown in FIG. 15, the first sliding surface 115t and the second sliding surface 118t are arranged in such a manner that they are almost overlapped with the slidable surfaces of the first sliding guide 116 and the first sliding part 115s in a plan view. That is to say, the second sliding surface 118t extends in parallel with the direction of the axis x of the threaded shaft 111a, but in a position offset therefrom in a plan view. Furthermore, in the present variation, as shown in FIG. 16, the whole second moving body 118 extends in parallel with the direction of the axis x of the threaded shaft 111a, but in a position offset therefrom in a plan view.

As a specific structural example, the pair of the first sliding surface 115t and the second sliding surface 118t may be provided by a general linear guide. That is to say, with reference to FIG. 15, the first sliding surface 115t may be provided as a concave surface, whose section has a concave shape, of a member which is called "block" of the linear guide, and the second sliding surface 118t may be provided as a lower surface, whose section has a rectangular shape, of a member which is called "rail" of the linear guide. For example, a commercially available linear guide may be disassembled, and subsequently a "block" thereof may be fixed to an upper surface of a main body of the first moving body 115 and a "rail" thereof may be fixed to a lower surface of a main body of the second moving body 118, which may result in that the pair is arranged.

As shown in FIGS. 14 to 16, the second moving body 118 is provided with a second sliding part 118s which extends in the perpendicular direction (the direction perpendicular to the direction of the axis x, i.e., the vertical direction in the present variation), and the second sliding part 118s is slidably movable relative to a second sliding guide 119 which extends in the same direction. The second sliding guide 119 is fixed to a central frame wall 112d fixed to an upper surface of the frame bottom plate 112a. In addition, in the present variation, a load cell 21 is provided on an upper surface of the second moving body 118.

The roll press machine shown in FIGS. 14 to 16 includes a pair of the above described electric lifting apparatuses 110. As shown in FIG. 16, in the pair of electric lifting apparatuses 110, the frame bottom plate 112a and the central frame wall 112d are arranged as common members. Each of the second sliding guides 119 is fixed on each of the left and right sides of the central frame wall 112d.

In the roll press machine shown in FIGS. 14 to 16 as well as in the roll press machine 20 shown in FIGS. 1 and 2, a pair of lower roll supporting bodies 22 (one side roll supporting parts) are respectively supported by the pair of second moving bodies 118 of the pair of electric lifting apparatuses 110. Each of the pair of lower roll supporting bodies 22 is placed on the corresponding second moving body 118 via the load cell 21. The pair of lower roll supporting bodies 22 has bearings configured to support a lower roll 23 in such a manner that the lower roll 23 is rotatable.

An upper roll 24 is arranged opposite to the lower roll 23. A press forming (consolidating) of a work W is carried out by using a gap formed between the lower roll 23 and the upper roll 24.

The upper roll 24 is supported by a pair of upper roll supporting bodies 25 (the other side roll supporting parts) in such a manner that the upper roll 24 is rotatable. Each of the pair of upper roll supporting bodies 25 is fixed to each of a pair of roll frames 26 provided on a base 140, for example via bolt screws or the like not shown from outside.

As a dimensional example of each element, when a lifting force (pressing force) of the electric lifting apparatus 110 is 300 kN as a nominal value (600 kN for a pair of right and left ones) and a diameter of each roll is 450 mm, a size of the frame bottom plate 112a is 110 cm (length seen in FIG. 14)×50 cm (length seen in FIG. 15) in a plan view, and a thickness thereof is about 5 cm.

In the electric lifting apparatus 110 of the second variation as well as in the electric lifting apparatus 10, the predetermined angle of the first sliding surface 115t may be selected within a range of 5.7 degrees to 11.3 degrees. The "5.7 degrees" is the solution of tan θ=1/10. The "11.3 degrees" is the solution of tan θ=1/5. Thus, a leverage ratio (lever mechanism ratio) of 5 to 10 times can be achieved.

Through the practical verification experiments carried out by the present inventors, it has been confirmed that the electric lifting apparatus 110 of the second variation is effectively operable within the above angle range.

A moving stroke of the second moving body 118 may be 1 mm, which is enough for an application as described below (an application in which a material consisting of a plurality of electrode layers having been baked on a metal foil is used as a work W).

A moving speed of the second moving body 118 may be 10 mm/sec, for example, which corresponds to a moving speed of the first moving body 115 (i.e., the nut 111d) of 50 mm/sec when the leverage ratio is 5 times, or a moving speed of the first moving body 115 (i.e., the nut 111d) of 100 mm/sec when the leverage ratio is 10 times. Such a moving speed of the nut 111d can be achieved by a commercially available general electric motor 113 and a commercially available general ball screw 111. In particular, when the electric motor 113 is a servomotor, a control with higher precision and higher responsivity can be achieved.

[Operation of Electric Lifting Apparatus 110]

Next, an operation of the electric lifting apparatus 110 of the second variation is explained.

When the electric motor 113 is driven in a desired manner (for example, the electric motor 113 may be controlled by the controlling device 35 as described above), the output shaft 113s of the electric motor 113 rotates. Subsequently, via the coupling 113c, a rotational force of the output shaft 113s is transferred to a rotational force of the threaded shaft 111a. Subsequently, a rotation of the threaded shaft 111a is converted to a linear movement of the nut 111d in the direction of the axis x by a converting function of the ball screw 11l between the rotational movement and the linear movement.

Thereby, the first moving body 115 fixed to the nut 111d moves linearly in the direction of the axis x. Herein, the linear movement of the first moving body 115 in the direction of the axis x is smoothly achieved because of an interaction between the first sliding guide 116 and the first sliding part 115s (a facilitating action of a smooth sliding movement).

Subsequently, when the nut 111d and the first moving body 115 move linearly in the direction of the axis x, the second moving body 118 moves linearly in the direction perpendicular to the direction of the axis x, by a sliding movement between the first sliding surface 115t and the second sliding surface 118t. Herein, the linear movement of the second moving body 118 is smoothly achieved because of an interaction between the second sliding guide 119 and the second sliding part 118s (a facilitating action of a smooth sliding movement).

Herein, as shown in FIG. 16, since the pair of second moving bodies 118 are arranged in a well-balanced manner with respect to the pair of threaded shafts 111a, the linear movement (horizontal movement) of the pair of first moving bodies 115 can be converted to the linear movement (up and down movement) of the pair of second moving bodies 18 in a well-balanced manner, and a load (reaction force) received by the second moving bodies 118 can be also supported by the base 140 via the first moving bodies 115t and so on in a well-balanced manner.

In addition, when the electric motor 113 is driven in a desired manner, the movement of the second moving body 118 can be controlled in a desired manner with high precision. In particular, when the electric motor 113 is a servomotor, a control with higher precision and higher responsivity can be achieved.

[Effects of Electric Lifting Apparatus 110]

As described above, according to the electric lifting apparatus 110 of the second variation as well, the rotational force of the output shaft 113s of the electric motor 113 is used as the rotational force of the threaded shaft 111a of the ball screw 111, and the second moving body 118 moves linearly in the direction perpendicular to the direction of the axis x when the first moving body 115 fixed to the nut 111d of the ball screw 111 moves linearly in the direction of the axis x. Thereby, the movement of the second moving body 118 can be controlled with high precision by the electric motor 113.

In addition, according to the electric lifting apparatus 110 of the second variation as well, since the threaded shaft 111a extends through the first moving body 115 in the direction of the axis x and the pair of bearings 111b, 111c is arranged on the both sides of the first moving body 115, the whole electric lifting apparatus 110 is compact.

In addition, according to the electric lifting apparatus 110 of the second variation, since the output shaft 113s of the electric motor 113 and the threaded shaft 111a are coupled in a simple manner via the coupling 113c, maintenance performance thereof is better.

Furthermore, since a hydraulic system is not adopted, i.e., since there is no concern about pollution of the surrounding by oil, the electric lifting apparatus 110 of the second variation is also suitable to be displaced in a glove box.

In addition, according to the electric lifting apparatus 110 of the second variation as well, the frame 112 is provided with the first sliding guide 116 which extends in parallel with the direction of the axis x, and the first moving body 115 is provided with the first sliding part 115s which is slidably movable relative to the first sliding guide 116. Thereby, because of the interaction therebetween (the facilitating action of the smooth sliding movement), the movement of the first moving body 115 in the direction of the axis x is more smoothly achieved.

In addition, according to the electric lifting apparatus 110 of the second variation as well, the frame 112 is provided with the second sliding guide 119 which extends perpendicularly to the direction of the axis x, and the second moving body 118 is provided with the second sliding part 118s which is slidably movable relative to the second sliding guide 119. Thereby, because of the interaction therebetween (the facilitating action of the smooth sliding movement), the movement of the second moving body 118 in the direction perpendicular to the direction of the axis x is more smoothly achieved.

In addition, according to the electric lifting apparatus 110 of the second variation, the first sliding part 115s extends in parallel with the direction of the axis x of the threaded shaft 111a but in the position offset therefrom in a plan view, the first sliding surface 115t also extends in parallel with the direction of the axis x of the threaded shaft 111a but in the position offset therefrom in a plan view, the first sliding surface 115t and the first sliding part 115s are arranged in such a manner they are almost overlapped with each other in a plan view, and the whole second moving body 118 extends in parallel with the direction of the axis x of the threaded shaft 111a but in the position offset therefrom in a plan view. Thereby, the whole combination of the first sliding surface 115t, the first sliding part 115s and the second moving body 118 can be arranged in a position offset from the electric motor 113, which can contribute to making the apparatus layout more compact.

In addition, in the roll press machine shown in FIGS. 14 to 16, the pair of second sliding guides 119 of the pair of electric lifting apparatuses 110 are supported by the common frame wall 112d. This also contributes to making the apparatus layout more compact.

[Third Variation of Electric Lifting Apparatus]

Figure 17:
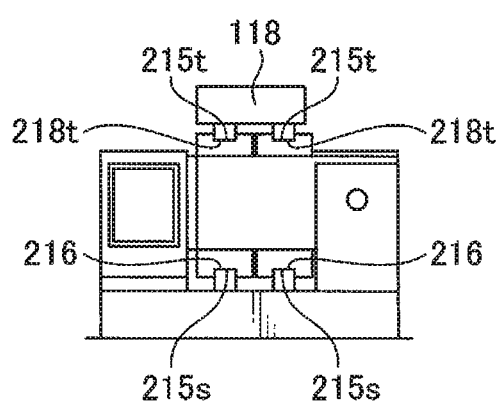
FIG. 17 is a schematic side view showing a third variation of the electric lifting apparatus.
Figure 18:
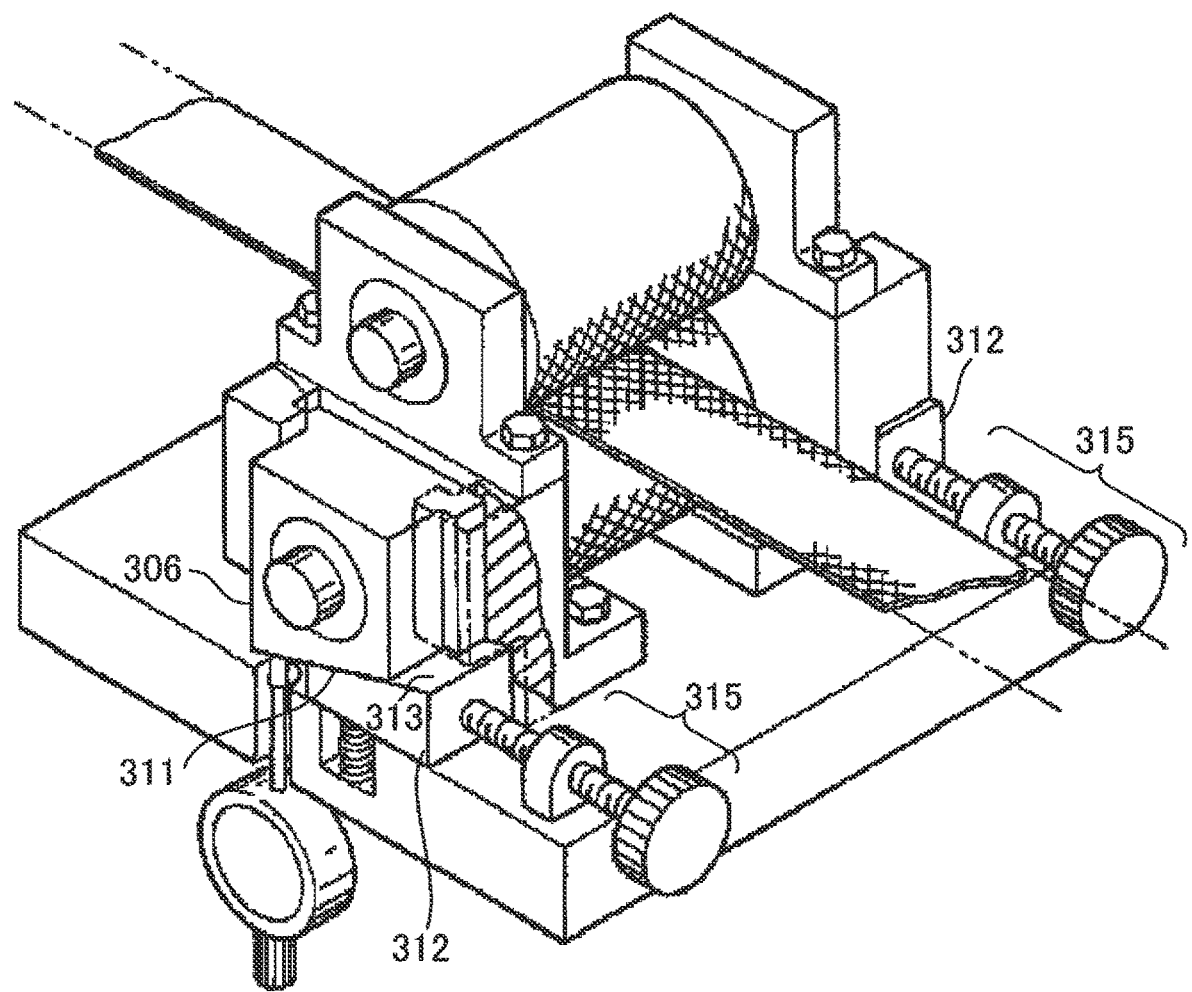
FIG. 18 is a schematic view showing a conventional forming-roll gap adjusting mechanism (which corresponds to FIG. 1 of Patent Document 1)
Figure 19:
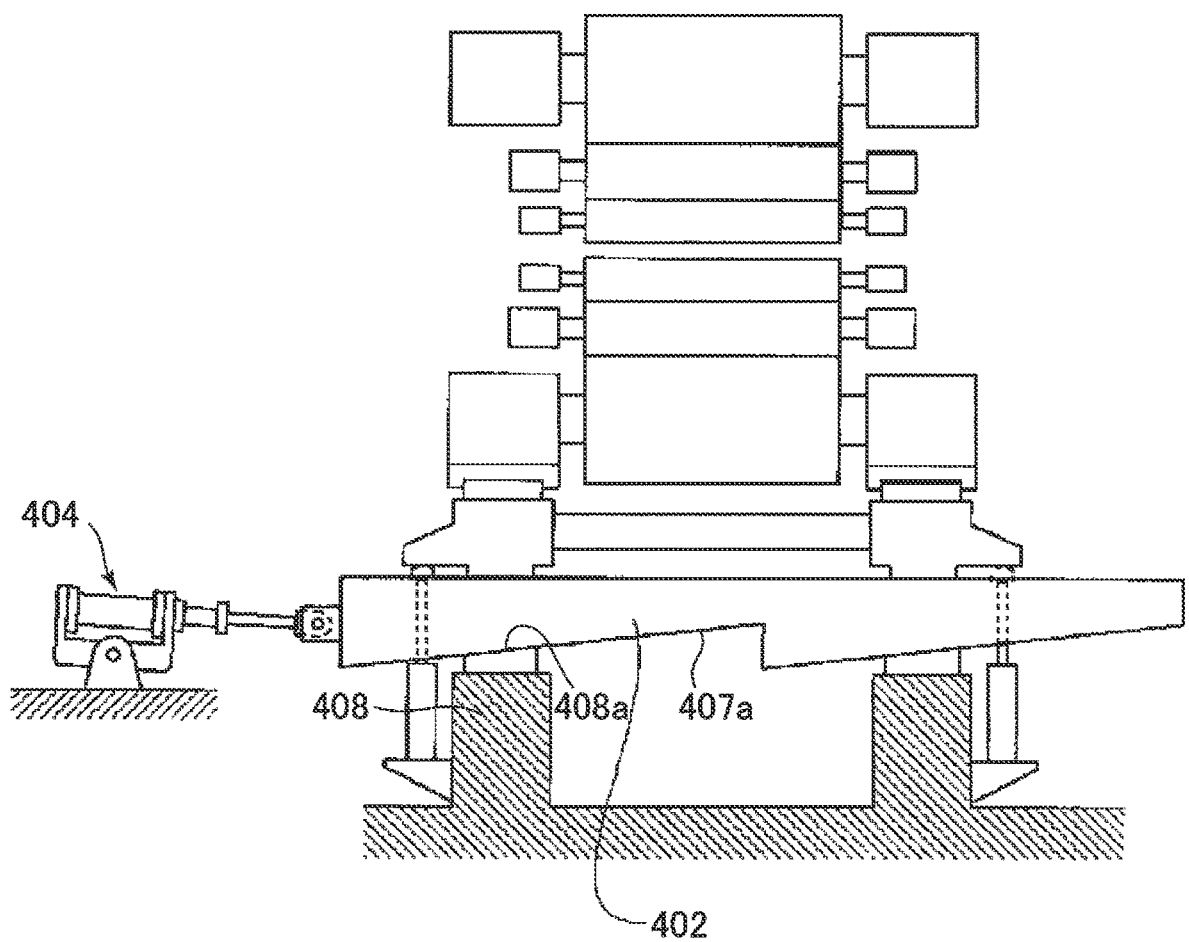
FIG. 19 is a schematic view showing a conventional path-line adjusting mechanism (which corresponds to FIG. 3 of Patent Document 2).

FIG. 17 is a schematic side view of a third variation of the electric lifting apparatus.

In the third variation, as shown in FIG. 17, instead of the one first sliding surface 115t in the second variation, two first sliding surfaces 215t are provided. Each of the two first sliding surfaces 215t extends in the direction of the axis x of the threaded shaft 111a, as well as the first sliding surface 115t.

Correspondingly, in the third variation, as shown in FIG. 17, instead of the one second sliding surface 118*t* in the second variation, two second sliding surfaces 218*t* are provided. Each of the two second sliding surfaces 218*t* also extends in the direction of the axis x of the threaded shaft 111*a*, as well as the second sliding surface 118*t*.

Furthermore, in the third variation, as shown in FIG. 17, instead of the one first sliding part 115*s* in the second variation, two first sliding parts 215*s* are provided. Each of the two first sliding parts 215*s* also extends in the direction of the axis x of the threaded shaft 111*a*, in the same way as the first sliding part 115*s*.

Correspondingly, in the third variation, as shown in FIG. 17, instead of the one first sliding guide 116 in the second variation, two first sliding guides 216 are provided. Each of the two first sliding guides 216 also extends in the direction of the axis x of the threaded shaft 111*a*, as well as the first sliding guide 116.

What is claimed is:

1. A roll press machine comprising:
   a first side roll and a second side roll arranged opposite to each other for consolidating a work;
   a first side roll supporting part configured to support the first side roll for rotation;
   a second side roll supporting part configured to support the second side roll for rotation;
   a moving apparatus including an electric motor and configured to move at least one of the first side roll supporting part or the second side roll supporting part relative to each other to control a gap between the first side roll and the second side roll;
   feed rolls configured to supply the work through the gap;
   a position sensor configured to detect a position of a front edge of the work supplied into the gap by the feed rolls; and
   a controller configured to control the moving apparatus, based on detection results by the position sensor, to maintain the gap larger than a consolidating gap while a front edge of the work arrives at the gap and travels through the gap by a first predetermined distance, then set the gap equal to the consolidation gap when the front edge of the work arrives at the first predetermined distance through the gap, and then maintain the gap equal to the consolidation gap after the front edge of the work travels further than the first predetermined distance through the gap, wherein the first predetermined distance is within a range of 0.001 mm to 3.000 mm.

2. The roll press machine according to claim 1, wherein the position sensor is configured to detect a position of a rear edge of the work supplied into the gap by the feed rolls, and
   the controller is configured to control the moving apparatus, based on detection results by the position sensor, to maintain the gap equal to the consolidation gap until the rear edge of the work arrives upstream of the gap at a second predetermined distance from the gap, then set the gap larger than the consolidation gap when the rear edge of the work arrives upstream of the gap at the second predetermined distance from the gap, and then maintain the gap larger than the consolidation gap until the rear edge of the work leaves the gap.

3. The roll press machine according to claim 2, wherein the second predetermined distance is within a range of 0.001 mm to 3.000 mm.

4. The roll press machine according to claim 1, wherein the controller is configured to maintain the consolidation gap within a range of 70% to 90% of a thickness of the work before consolidation.

5. The roll press machine according to claim 1, wherein the controller is configured to increase and decrease the consolidation gap at a frequency of 1 Hz to 10 Hz within a range of 70% to 110% of a thickness of the work before consolidation.

6. A controlling system for controlling a roll press machine, the roll press machine including
   a first side roll and a second side roll arranged opposite to each other for consolidating a work;
   a first side roll supporting part configured to support the first side roll for rotation;
   a second side roll supporting part configured to support the second side roll for rotation;
   a moving apparatus including an electric motor and configured to move at least one of the first side roll supporting part or the second side roll supporting part relative to each other to control a gap between the first side roll and the second side roll; and
   feed rolls configured to supply the work through the gap, wherein the controlling system comprises:
   a position sensor configured to detect a position of a front edge of the work supplied into the gap by the feed rolls; and
   a controller configured to control the moving apparatus, based on detection results by the position sensor, to maintain the gap larger than a consolidating gap while a front edge of the work arrives at the gap and travels through the gap by a first predetermined distance, then set the gap equal to the consolidation gap when the front edge of the work arrives at the first predetermined distance through the gap, and then maintain the gap equal to the consolidation gap after the front edge of the work travels further than the first predetermined distance through the gap, wherein the first predetermined distance is within a range of 0.001 mm to 3.000 mm.

7. The controlling system according to claim 6, wherein the position sensor is configured to detect a position of a rear edge of the work supplied into the gap by the feed rolls, and
   the controller is configured to control the moving apparatus, based on detection results by the position sensor, to maintain the gap equal to the consolidation gap until the rear edge of the work arrives upstream of the gap at a second predetermined distance from the gap, then set the gap larger than the consolidation gap when the rear edge of the work arrives upstream of the gap at the second predetermined distance from the gap, and then maintain the gap larger than the consolidation gap until the rear edge of the work leaves the gap.

8. The controlling system according to claim 7, wherein the second predetermined distance is within a range of 0.001 mm to 3.000 mm.

9. The controlling system according to claim 6, wherein the controller is configured to maintain the consolidation gap within a range of 70% to 90% of a thickness of the work before consolidation.

10. The controlling system according to claim 6, wherein the controller is configured to increase and decrease the consolidation gap at a frequency of 1 Hz to 10 Hz within a range of 70% to 110% of a thickness of the work before consolidation.

11. A controlling method of controlling a roll press machine, the roll press machine comprising:
    a first side roll and a second side roll arranged opposite to each other for consolidating a work;
    a first side roll supporting part configured to support the side roll for rotation;

a second side roll supporting part configured to support the second side roll for rotation;

a moving apparatus including an electric motor and configured to move at least one of the first side roll supporting part or the second side roll supporting part relative to each other to control a gap between the first side roll and the second side roll; and feed rolls configured to supply the work through the gap, the controlling method comprising the steps of:

detecting a position of a front edge of the work supplied into the gap by the feed rolls; and controlling the moving apparatus based on detection results obtained in the detecting step, wherein the step of controlling the moving apparatus comprises:

maintaining the gap larger than a consolidating gap while the front edge of the work arrives at the gap and travels through the gap by a first predetermined distance, set the gap equal to the consolidation gap when the front edge of the work arrives at the first predetermined distance through the gap, and maintain the gap equal to the consolidation gap after the front edge of the work travels further than the first predetermined distance through the gap, wherein the first predetermined distance is within a range of 0.001 mm to 3.000 mm.

12. The controlling method according to claim 11, wherein the step of detecting a front edge of the work comprises detecting a position of a rear edge of the work supplied into the gap by the feed rolls, and the step of controlling the moving apparatus comprises maintaining the gap equal to the consolidation gap until the rear edge of the work arrives upstream of the gap at a second predetermined distance from the gap, then setting the gap larger than the consolidation gap when the rear edge of the work arrives upstream of the gap at the second predetermined distance from the gap, and then maintaining the gap larger than the consolidation gap until the rear edge of the work leaves the gap.

13. The controlling method according to claim 12, wherein the second predetermined distance is within a range of 0.001 mm to 3.000 mm.

14. The controlling method according to claim 11, wherein the step of controlling the moving apparatus comprising maintaining the consolidation gap within a range of 70% to 90% of a thickness of the work before consolidation.

15. The controlling method according to claim 11, wherein the step of controlling the moving apparatus comprises increasing and decreasing the consolidation gap at a frequency of 1 Hz to 10 Hz within a range of 70% to 110% of a thickness of the work before consolidation.

* * * * *